(12) United States Patent
Kawata

(10) Patent No.: US 10,951,785 B2
(45) Date of Patent: Mar. 16, 2021

(54) IMAGE READING APPARATUS

(71) Applicant: PFU Limited, Ishikawa (JP)

(72) Inventor: Kengo Kawata, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/781,795

(22) Filed: Feb. 4, 2020

(65) Prior Publication Data
US 2020/0288029 A1 Sep. 10, 2020

(30) Foreign Application Priority Data

Mar. 6, 2019 (JP) .............................. JP2019-040641

(51) Int. Cl.
*H04N 1/04* (2006.01)
*H04N 1/00* (2006.01)

(52) U.S. Cl.
CPC ..... *H04N 1/00612* (2013.01); *H04N 1/00631* (2013.01); *H04N 1/00702* (2013.01); *H04N 1/00755* (2013.01); *H04N 1/00806* (2013.01)

(58) Field of Classification Search
CPC ........... H04N 1/00612; H04N 1/00631; H04N 1/00702; H04N 1/00755; H04N 1/00806
USPC ................................. 358/498, 496
See application file for complete search history.

(56) References Cited

U.S. PATENT DOCUMENTS

| | | | | |
|---|---|---|---|---|
| 4,750,016 A * | 6/1988 | Kusumoto | ............. | B41J 13/009 271/65 |
| 5,201,518 A * | 4/1993 | Isoda | ..................... | B65H 29/58 271/287 |
| 5,237,381 A * | 8/1993 | Hamada | ................ | B65H 23/34 399/406 |
| 5,513,017 A * | 4/1996 | Knodt | .................... | G03G 15/50 358/471 |
| 5,862,435 A * | 1/1999 | Suzumi | ............. | G03G 15/6552 399/405 |
| 5,887,867 A * | 3/1999 | Takahashi | ............... | B65H 1/08 271/117 |
| 6,131,902 A * | 10/2000 | Takenaka | .......... | G03G 15/6552 271/279 |
| 6,134,417 A * | 10/2000 | Fukasawa | ............. | G03G 15/60 399/367 |
| 6,511,241 B2 * | 1/2003 | Fetherolf | ............. | B41J 13/0036 271/303 |
| 7,573,619 B2 * | 8/2009 | Tsai | ..................... | G03G 15/602 358/474 |

(Continued)

FOREIGN PATENT DOCUMENTS

JP       2000-128413 A       5/2000

*Primary Examiner* — Cheukfan Lee
(74) *Attorney, Agent, or Firm* — McDermott Will & Emery LLP

(57) ABSTRACT

An image reading apparatus includes a first conveyance path, a second conveyance path, an insertion/discharge port, an image reader that reads an image on a medium conveyed along the first conveyance path, and a switch that is located at a first position or a second position, wherein the switch disconnects the first conveyance path from the second conveyance path and connects the insertion/discharge port and the first conveyance path when the switch is located at the first position, and disconnects the insertion/discharge port from the first conveyance path and connects the first conveyance path and the second conveyance path when the switch is located at the second position.

16 Claims, 16 Drawing Sheets

(56) References Cited

U.S. PATENT DOCUMENTS

| | | | | |
|---|---|---|---|---|
| 8,305,659 B2* | 11/2012 | Chen | | H04N 1/1215 |
| | | | | 358/498 |
| 8,950,749 B2* | 2/2015 | Maeda | | B65H 7/20 |
| | | | | 271/270 |
| 9,413,911 B2* | 8/2016 | Sasaki | | H04N 1/00588 |
| 9,457,981 B2* | 10/2016 | Abivin | | C09K 8/706 |
| 10,462,317 B2* | 10/2019 | Kawata | | H04N 1/00649 |
| 2008/0259414 A1* | 10/2008 | Kitagawa | | H04N 1/00623 |
| | | | | 358/498 |
| 2010/0208311 A1* | 8/2010 | Furihata | | H04N 1/2034 |
| | | | | 358/498 |
| 2011/0096379 A1* | 4/2011 | Kurokawa | | H04N 1/00681 |
| | | | | 358/498 |
| 2011/0199654 A1* | 8/2011 | Takata | | H04N 1/00591 |
| | | | | 358/498 |
| 2011/0273753 A1* | 11/2011 | Yonemura | | H04N 1/00631 |
| | | | | 358/498 |
| 2012/0008155 A1* | 1/2012 | Nakanishi | | H04N 1/2032 |
| | | | | 358/1.9 |
| 2013/0083367 A1* | 4/2013 | Hara | | B65H 29/60 |
| | | | | 358/449 |
| 2013/0083374 A1* | 4/2013 | Nagai | | H04N 1/00779 |
| | | | | 358/488 |
| 2014/0063574 A1* | 3/2014 | Uchida | | H04N 1/00655 |
| | | | | 358/498 |
| 2014/0092456 A1* | 4/2014 | Ukai | | H04N 1/00588 |
| | | | | 358/498 |
| 2014/0138900 A1* | 5/2014 | Takahata | | B65H 5/26 |
| | | | | 271/3.19 |
| 2014/0191467 A1* | 7/2014 | Miura | | H04N 1/0071 |
| | | | | 271/264 |
| 2014/0211277 A1* | 7/2014 | Ozaki | | H04N 1/00588 |
| | | | | 358/496 |
| 2017/0327331 A1* | 11/2017 | Nakashima | | H04N 1/00615 |
| 2018/0352099 A1* | 12/2018 | Hongo | | H04N 1/00602 |
| 2019/0248613 A1* | 8/2019 | Morikawa | | B65H 29/125 |
| 2019/0270604 A1* | 9/2019 | Morikawa | | B65H 5/36 |
| 2019/0337744 A1* | 11/2019 | Morikawa | | B65H 29/60 |
| 2020/0002110 A1* | 1/2020 | Morikawa | | B65H 3/5223 |

* cited by examiner

IMAGE READING APPARATUS

CROSS-REFERENCE TO RELATED APPLICATION

The application is based upon and claims the benefit of priority of the prior Japanese Patent Application No. 2019-040641 filed on Mar. 6, 2019, the entire contents of which are incorporated herein by reference.

FIELD

The embodiments discussed herein are related to an image reading apparatus.

BACKGROUND

There is a known image reading apparatus that is provided with two conveyance paths and reads an image on the medium by conveying the medium along the conveyance path that corresponds to the type of medium (see Japanese Laid-open Patent Publication No. 2000-128413). This kind of image reading apparatus includes a switch that switches the conveyance path, thereby properly guiding the medium to the conveyance path.

SUMMARY

According to an aspect of an embodiment, an image reading apparatus includes a first conveyance path, a second conveyance path, an insertion/discharge port, an image reader that reads an image on a medium conveyed along the first conveyance path, and a switch that is located at a first position or a second position, wherein the switch disconnects the first conveyance path from the second conveyance path and connects the insertion/discharge port and the first conveyance path when the switch is located at the first position, and disconnects the insertion/discharge port from the first conveyance path and connects the first conveyance path and the second conveyance path when the switch is located at the second position.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
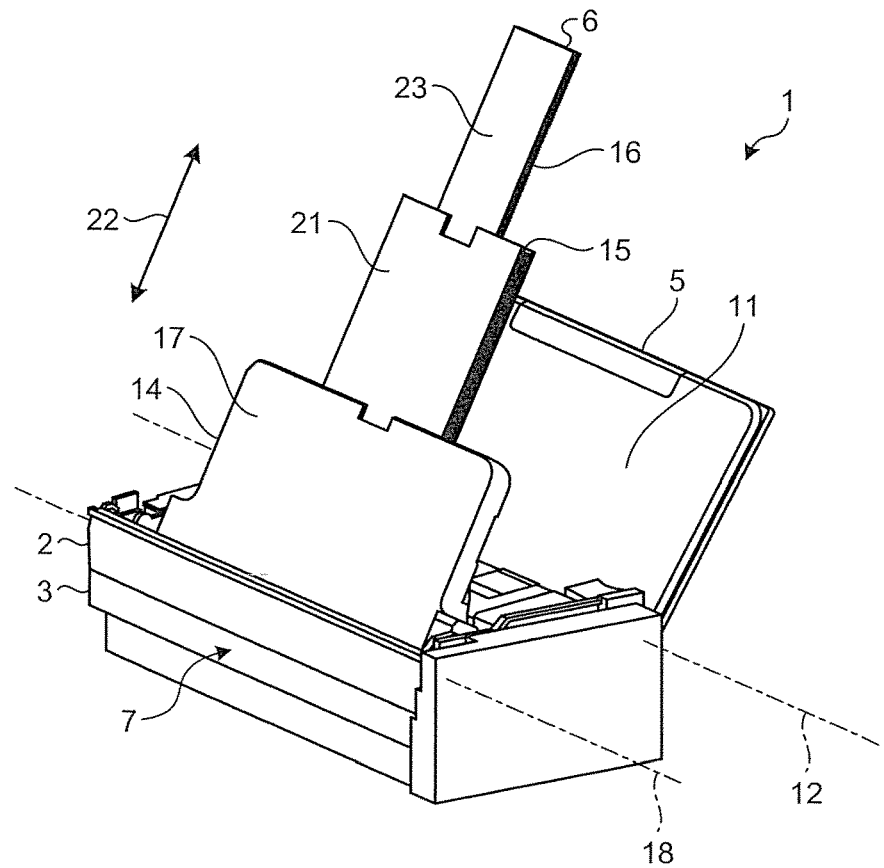
FIG. 1 is a perspective view that illustrates an image reading apparatus according to an embodiment.

Preferred embodiments of the disclosure will be explained with reference to accompanying drawings. With reference to the drawings, an image reading apparatus according to an embodiment disclosed in the subject application is explained below. Furthermore, the present disclosure is not limited to the following descriptions. Moreover, in the following descriptions, the same component is attached with the same reference numeral, and duplicated explanations are omitted.

FIG. 1 is a perspective view that illustrates an image reading apparatus 1 according to the embodiment. As illustrated in FIG. 1, the image reading apparatus 1 includes an image reading apparatus main body 2, a switch 3, a feed tray 5, and an exit tray 6. The image reading apparatus main body 2 is formed in a box shape and is placed on the installation surface where the image reading apparatus 1 is installed. The image reading apparatus main body 2 is provided with an insertion/discharge port 7. The switch 3 is provided near the insertion/discharge port 7. The feed tray 5 is formed in a plate-like shape, and a feed tray placement surface 11 is formed thereon. The feed tray 5 is supported by the image reading apparatus main body 2 so as to be rotatable around a rotation axis 12 so that it is located at the feed tray extension position or the feed tray retraction position. As illustrated in FIG. 1, when the feed tray 5 is located at the feed tray extension position, it is disposed such that the feed tray placement surface 11 faces obliquely upward and is fixed to the image reading apparatus main body 2.

The exit tray 6 includes a first exit tray member 14, a second exit tray member 15, a third exit tray member 16, an undepicted first gear mechanism, and a second gear mechanism, and it is formed to be extendable. The first exit tray member 14 is formed in a plate-like shape, and it is provided with a first exit tray placement surface 17. The first exit tray member 14 is supported by the image reading apparatus main body 2 so as to be rotatable around a rotation axis 18 so that it is located at the exit tray extension position or the exit tray retraction position. As illustrated in FIG. 1, when the first exit tray member 14 is located at the exit tray extension position, it is disposed such that the first exit tray placement surface 17 faces obliquely upward and is fixed to the image reading apparatus main body 2.

The second exit tray member 15 is formed in a plate-like shape, and it is provided with a second exit tray placement surface 21. The second exit tray member 15 is disposed such that the second exit tray placement surface 21 conforms to the plane along the first exit tray placement surface 17, and it is supported by the first exit tray member 14 so as to be translatable in an extending and shrinking direction 22 so that it is located at the second exit tray extending position or the second exit tray shrinking position. The extending and shrinking direction 22 is parallel to the plane along the first exit tray placement surface 17 and is perpendicular to the rotation axis 18. As illustrated in FIG. 1, the second exit tray member 15 is disposed such that, when it is located at the second exit tray extending position, the second exit tray placement surface 21 is positioned on the far side from the rotation axis 18 as compared with the first exit tray placement surface 17.

When the first exit tray member 14 moves toward the exit tray extension position, the first gear mechanism converts the rotary movement of the first exit tray member 14 into the translational movement of the second exit tray member 15 so that the second exit tray member 15 moves toward the second exit tray extending position. Furthermore, when the first exit tray member 14 is located at the exit tray extension position, the first gear mechanism causes the second exit tray member 15 to be located at the second exit tray extending position.

The third exit tray member 16 is formed in a plate-like shape and is provided with a third exit tray placement surface 23. The third exit tray member 16 is disposed such that the third exit tray placement surface 23 conforms to the plane along the second exit tray placement surface 21, and it is supported by the second exit tray member 15 so as to be translatable in the extending and shrinking direction 22 so that it is located at the third exit tray extending position or the third exit tray shrinking position. As illustrated in FIG. 1, the third exit tray member 16 is disposed such that, when it is located at the third exit tray extending position, the third exit tray placement surface 23 is positioned on the far side from the rotation axis 18 as compared with the second exit tray placement surface 21.

When the second exit tray member 15 moves toward the second exit tray extending position, the second gear mechanism converts the rotary movement of the second exit tray member 15 into the translational movement of the third exit tray member 16 so that the third exit tray member 16 moves toward the third exit tray extending position. Furthermore, when the second exit tray member 15 is located at the second exit tray extending position, the second gear mechanism causes the third exit tray member 16 to be located at the third exit tray extending position. That is, when the first exit tray member 14 is located at the exit tray extension position, the exit tray 6 extends such that the first exit tray placement surface 17, the second exit tray placement surface 21, and the third exit tray placement surface 23 are arranged along the same plane.

Figure 2:
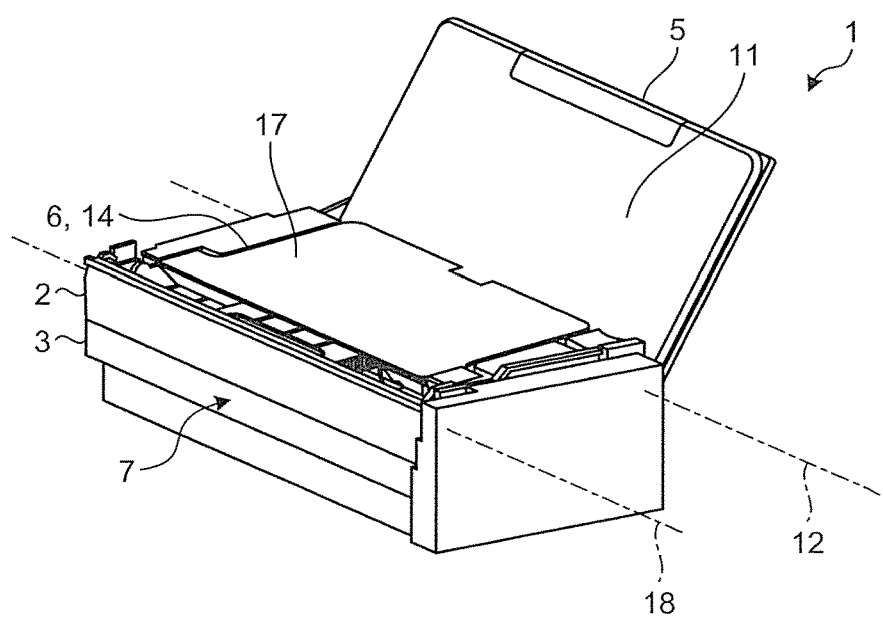
FIG. 2 is a perspective view that illustrates the image reading apparatus according to the embodiment when a first exit tray member is located at the exit tray retraction position.
Figure 3:
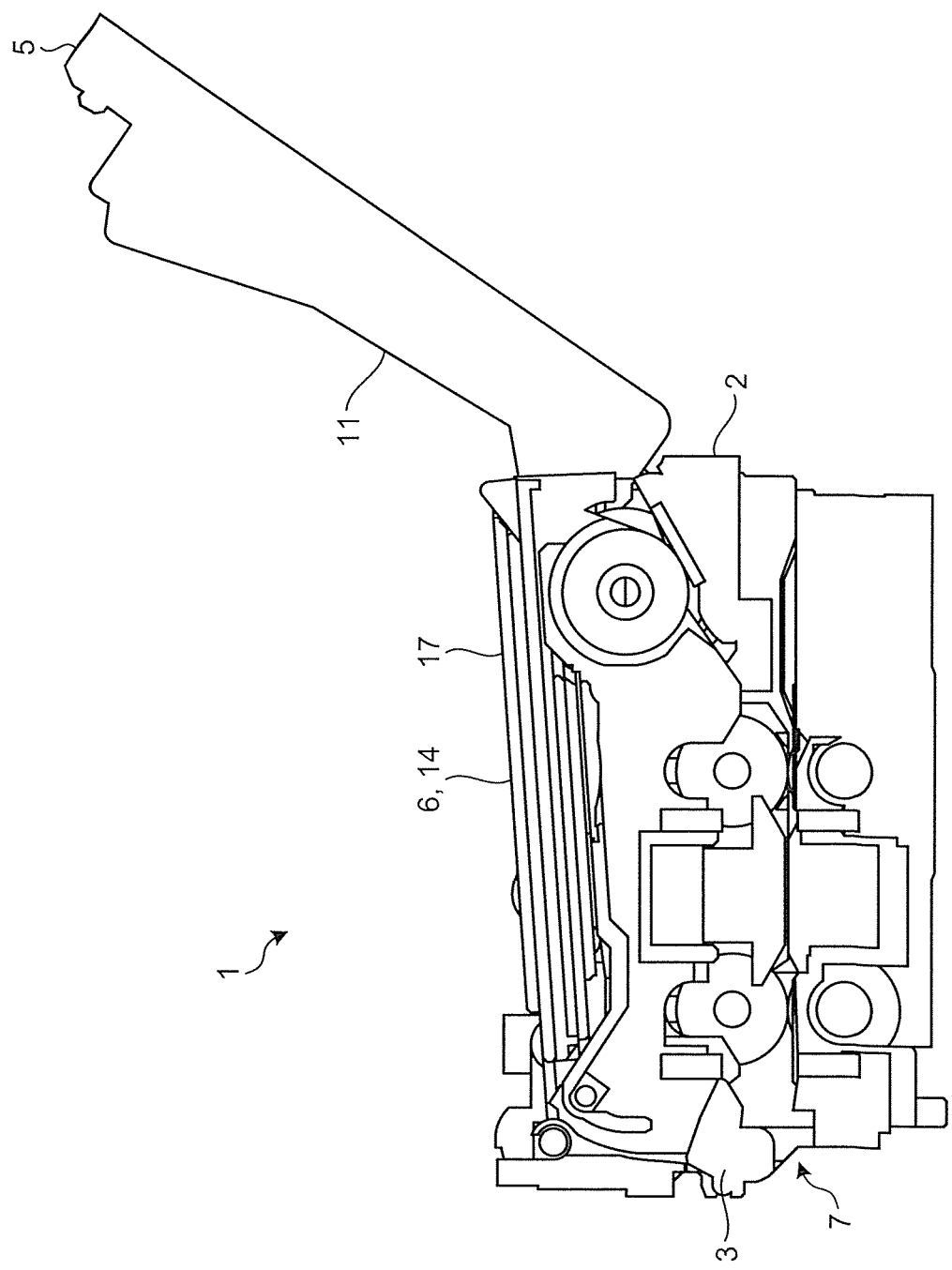
FIG. 3 is a sectional side view that illustrates the image reading apparatus according to the embodiment when the first exit tray member is located at the exit tray retraction position.

FIG. 2 is a perspective view that illustrates the image reading apparatus 1 according to the embodiment when the first exit tray member 14 is located at the exit tray retraction position. FIG. 3 is a sectional side view that illustrates the image reading apparatus 1 according to the embodiment when the first exit tray member 14 is located at the exit tray retraction position. The first exit tray member 14 is disposed such that it conforms to the top surface of the image reading apparatus main body 2 when it is positioned at the exit tray retraction position. When the first exit tray member 14 moves toward the exit tray retraction position, the first gear mechanism converts the rotary movement of the first exit tray member 14 into the translational movement of the second exit tray member 15 so that the second exit tray member 15 moves toward the second exit tray shrinking position. Furthermore, when the first exit tray member 14 is located at the exit tray retraction position, the first gear mechanism causes the second exit tray member 15 to be located at the second exit tray shrinking position. When the second exit tray member 15 is located at the second exit tray shrinking position, it is positioned on the inner side of the first exit tray member 14 such that the second exit tray placement surface 21 is overlapped with the first exit tray placement surface 17.

When the second exit tray member 15 moves toward the second exit tray shrinking position, the second gear mechanism converts the rotary movement of the second exit tray member 15 into the translational movement of the third exit tray member 16 so that the third exit tray member 16 moves toward the third exit tray shrinking position. When the second exit tray member 15 is located at the second exit tray shrinking position, the second gear mechanism causes the third exit tray member 16 to be located at the third exit tray shrinking position. When the third exit tray member 16 is located at the third exit tray shrinking position, it is disposed on the inner side of the second exit tray member 15 such that the third exit tray placement surface 23 is overlapped with the second exit tray placement surface 21.

Figure 4:
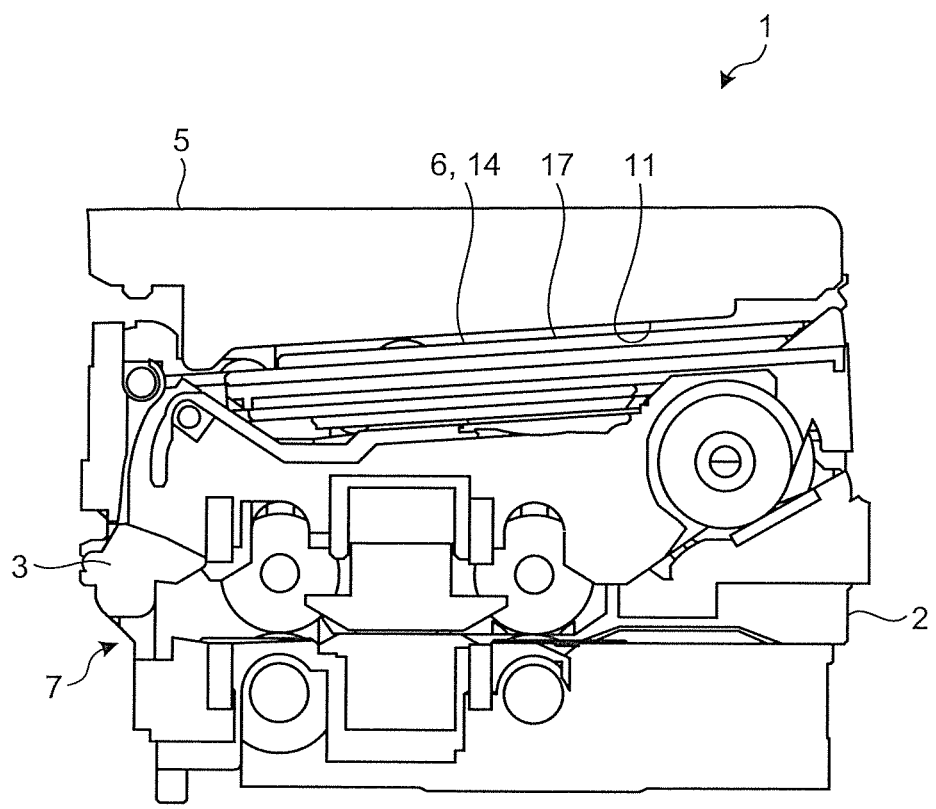
FIG. 4 is a sectional side view that illustrates the image reading apparatus according to the embodiment when a feed tray is located at the feed tray retraction position.

That is, when the first exit tray member 14 is located at the exit tray retraction position, the exit tray 6 shrinks such that the first exit tray placement surface 17, the second exit tray placement surface 21, and the third exit tray placement surface 23 are overlapped with one another, and it is retracted such that it conforms to the top surface of the image reading apparatus main body 2. Furthermore, when the first exit tray member 14 is set at the exit tray retraction position, the exit tray 6 is located away from the area that is passed by the feed tray 5 when it moves from the feed tray extension position to the feed tray retraction position. As the exit tray 6 is located away from the area, the exit tray 6 is prevented from interfering with the feed tray 5 when the feed tray 5 rotates around the rotation axis 12. As illustrated in FIG. 4, when the first exit tray member 14 is located at the exit tray retraction position, the feed tray 5 may be located at the feed tray retraction position. FIG. 4 is a sectional side view that illustrates the image reading apparatus 1 according to the embodiment when the feed tray 5 is located at the feed tray retraction position.

When the feed tray 5 is located at the feed tray retraction position, the feed tray placement surface 11 of the feed tray 5 faces downward so as to be opposed to the first exit tray placement surface 17. When the feed tray 5 is located at the feed tray retraction position, the image reading apparatus 1 is compact as compared with the image reading apparatus 1 when the feed tray 5 is located at the feed tray extension position, and it may be retracted in a smaller space.

Figure 5:
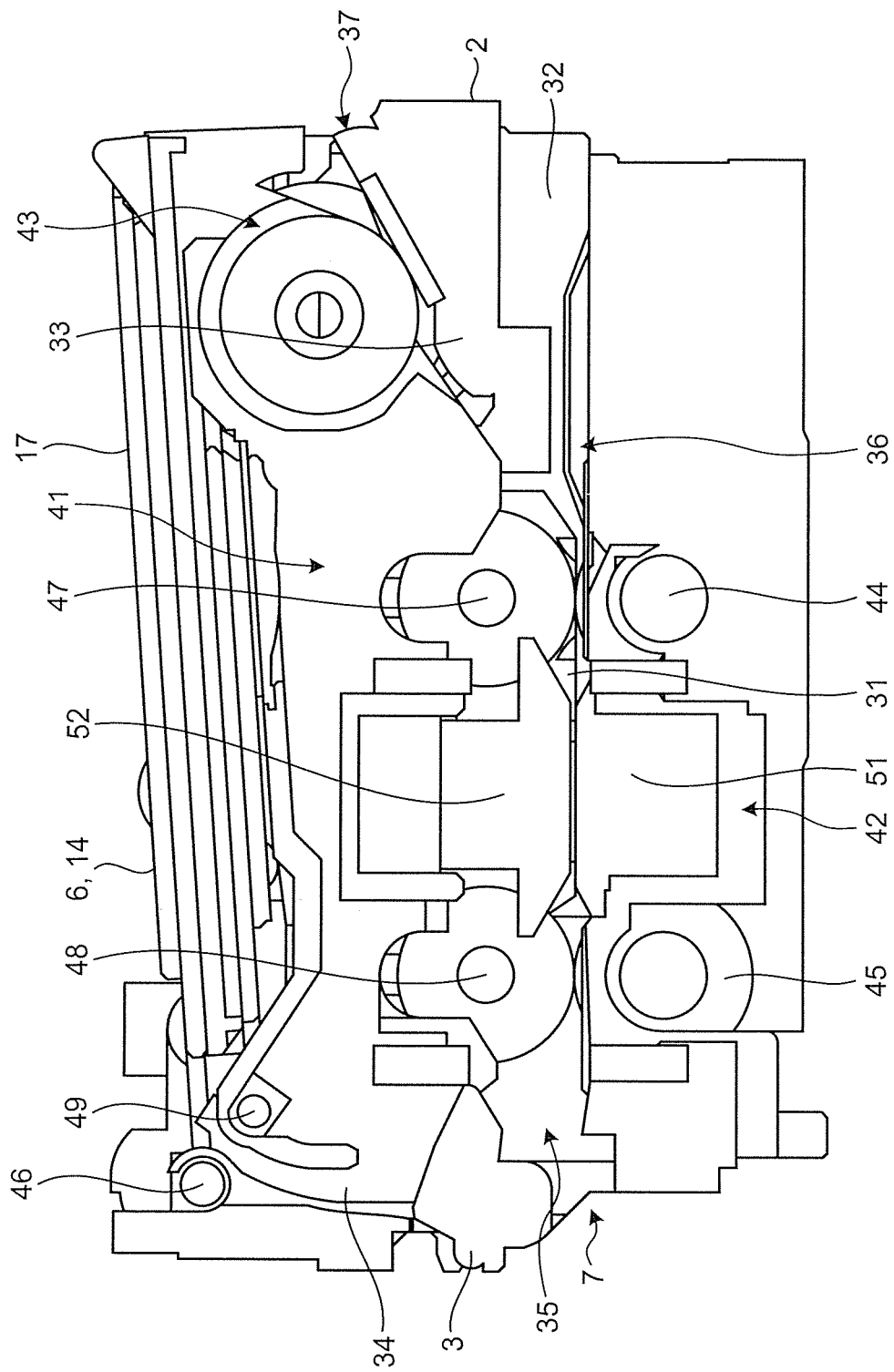
FIG. 5 is a sectional side view that illustrates the image reading apparatus according to the embodiment when the feed tray is removed from an image reading apparatus main body.

As illustrated in FIG. 5, the feed tray 5 is removable from the image reading apparatus main body 2. FIG. 5 is a sectional side view that illustrates the image reading apparatus 1 according to the embodiment when the feed tray 5 is removed from the image reading apparatus main body 2. When the feed tray 5 is removed from the image reading apparatus main body 2, the image reading apparatus 1 is compact as compared with the image reading apparatus 1 when the feed tray 5 is attached to the image reading apparatus main body 2, and it may be retracted in a smaller space. When the feed tray 5 is removed from the image reading apparatus main body 2, the image reading apparatus 1 is lightweight as compared with the image reading apparatus 1 when the feed tray 5 is attached to the image reading apparatus main body 2, whereby it is easy for a user to carry it.

The image reading apparatus main body 2 is further provided with a medium-reading conveyance path 31, a medium-drawing conveyance path 32, a medium-separating conveyance path 33, and a medium-discharging conveyance path 34. The medium-reading conveyance path 31 is formed inside the image reading apparatus main body 2 such that it extends along a different plane that is substantially parallel to the plane along the installation surface of the image reading apparatus 1. Furthermore, the medium-reading conveyance path 31 is disposed such that the plane along the medium-reading conveyance path 31 intersects with the insertion/discharge port 7. One end of the medium-reading conveyance path 31 is connected to a switching area 35 that is passed by the switch 3 when it moves relative to the image reading apparatus main body 2, and it is connected to the insertion/discharge port 7 through the switching area 35. The other end of the medium-reading conveyance path 31 is connected to a meeting point 36.

The medium-drawing conveyance path 32 is formed inside the image reading apparatus main body 2 such that it extends along the plane that is along the medium-reading conveyance path 31. One end of the medium-drawing conveyance path 32 is connected to the meeting point 36 and is connected to the medium-reading conveyance path 31 through the meeting point 36.

The medium-separating conveyance path 33 is formed inside the image reading apparatus main body 2 and above the medium-drawing conveyance path 32. One end of the medium-separating conveyance path 33 is connected to a sheet feed port 37 that is connected to the feed tray placement surface 11 when the feed tray 5 is located at the feed tray extension position, and it is connected to the feed tray placement surface 11 through the sheet feed port 37. The other end of the medium-separating conveyance path 33 is connected to the meeting point 36 and is connected to the medium-reading conveyance path 31 through the meeting point 36. The medium-separating conveyance path 33 is formed such that it extends along the plane that is tilted with respect to the plane along the installation surface so that the end of the medium-separating conveyance path 33 on the side close to the meeting point 36 is positioned lower than the end thereof on the side close to the feed tray placement surface 11.

The medium-discharging conveyance path 34 is formed to be bent inside the image reading apparatus main body 2 and above the switching area 35. When the first exit tray member 14 is located at the exit tray extension position, one end of the medium-discharging conveyance path 34 is connected to the first exit tray placement surface 17. The other end of the medium-discharging conveyance path 34 is connected to the switching area 35 and is connected to the medium-reading conveyance path 31 through the switching area 35.

The image reading apparatus 1 further includes a conveyer 41 and an image reader 42. The conveyer 41 includes a separator 43, a first feed roller 44, a second feed roller 45, a third feed roller 46, a first pressure roller 47, a second pressure roller 48, and a third pressure roller 49. The separator 43 is disposed in the middle of the medium-separating conveyance path 33.

The first feed roller 44 is formed in a cylindrical shape. The first feed roller 44 is disposed under the medium-reading conveyance path 31 such that it is in contact with a medium placed on the medium-reading conveyance path 31, and it is supported by the image reading apparatus main body 2 in a rotatable manner. The first feed roller 44 rotates forward (anticlockwise in FIG. 5) to convey the medium, which is in contact with the first feed roller 44, toward the switching area 35 along the medium-reading conveyance path 31. The first feed roller 44 rotates backward (clockwise in FIG. 5) to convey the medium, which is in contact with the first feed roller 44, toward the meeting point 36 along the medium-reading conveyance path 31.

The second feed roller 45 is formed in a cylindrical shape. The second feed roller 45 is disposed under the medium-reading conveyance path 31 and between the first feed roller 44 and the switching area 35 such that it is in contact with a medium placed on the medium-reading conveyance path 31, and it is supported by the image reading apparatus main body 2 in a rotatable manner. The second feed roller 45 rotates forward (anticlockwise in FIG. 5) to convey the medium, which is in contact with the second feed roller 45, toward the switching area 35 along the medium-reading conveyance path 31. The second feed roller 45 rotates backward (clockwise in FIG. 5) to convey a medium, which is in contact with the second feed roller 45, toward the meeting point 36 along the medium-reading conveyance path 31.

The third feed roller 46 is formed in a cylindrical shape. The third feed roller 46 is provided near the medium-discharging conveyance path 34 and is supported by the image reading apparatus main body 2 in a rotatable manner. When the first exit tray member 14 is located at the exit tray extension position, the third feed roller 46 rotates forward so that a medium placed on the medium-discharging conveyance path 34 is conveyed from the switching area 35 toward the first exit tray placement surface 17 of the first exit tray member 14.

The first pressure roller 47 is formed in a cylindrical shape. The first pressure roller 47 is disposed above the medium-reading conveyance path 31 and above the first feed roller 44. The first pressure roller 47 is supported by the image reading apparatus main body 2 such that it is rotatable and translatable in a vertical direction that is perpendicular to the plane along the medium-reading conveyance path 31. The first pressure roller 47 presses a medium placed on the medium-reading conveyance path 31 against the first feed roller 44 so that the medium placed on the medium-reading conveyance path 31 is properly in contact with the first feed roller 44.

The second pressure roller 48 is formed in a cylindrical shape. The second pressure roller 48 is disposed above the medium-reading conveyance path 31 and above the second feed roller 45. The second pressure roller 48 is supported by the image reading apparatus main body 2 such that it is translatable in the vertical direction and is rotatable. The second pressure roller 48 presses a medium placed on the medium-reading conveyance path 31 against the second feed roller 45 so that the medium placed on the medium-reading conveyance path 31 is properly in contact with the second feed roller 45.

The third pressure roller 49 is formed in a cylindrical shape. The third pressure roller 49 is disposed such that the medium-discharging conveyance path 34 is provided between the third feed roller 46 and the third pressure roller 49. The third pressure roller 49 is supported by the image reading apparatus main body 2 in a rotatable manner. The third pressure roller 49 presses a medium placed on the medium-discharging conveyance path 34 against the third feed roller 46 so that the medium placed on the medium-discharging conveyance path 34 is properly in contact with the third feed roller 46.

The image reader 42 includes a lower image reader 51 and an upper image reader 52. The lower image reader 51 is composed of an image sensor that is of the CIS (Contact Image Sensor) type. The lower image reader 51 is disposed under the medium-reading conveyance path 31 and between the first feed roller 44 and the second feed roller 45. The lower image reader 51 reads an image on the lower surface of the medium conveyed along the medium-reading conveyance path 31. The upper image reader 52 is composed of an image sensor that is of the CIS type. The upper image reader 52 is disposed above the medium-reading conveyance path 31, above the lower image reader 51, and between the first pressure roller 47 and the second pressure roller 48. The upper image reader 52 is supported by the image reading apparatus main body 2 such that it is translatable in the vertical direction. The upper image reader 52 reads an image on the upper surface of the medium conveyed along the medium-reading conveyance path 31.

Figure 6:
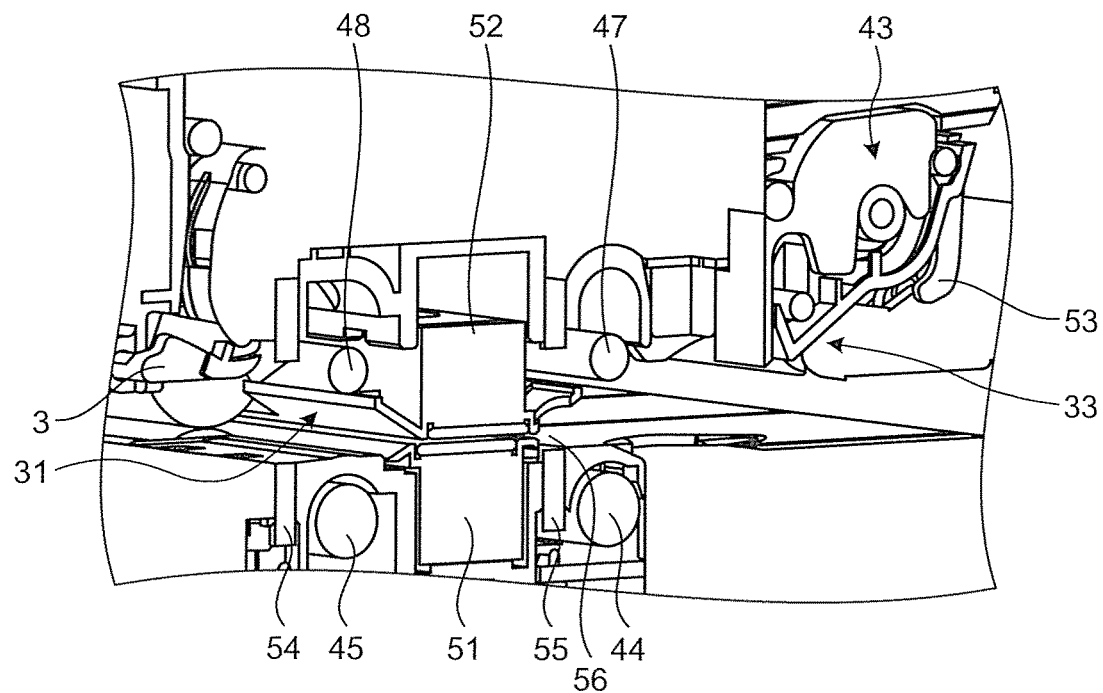
FIG. 6 is a perspective view that illustrates a medium-reading conveyance path and a medium-separating conveyance path.

FIG. 6 is a perspective view that illustrates the medium-reading conveyance path 31 and the medium-separating conveyance path 33. The image reading apparatus 1 further includes a first medium placement sensor 53, a second medium placement sensor 54, and a medium-position detection sensor 55. The first medium placement sensor 53 is positioned on the far side from the meeting point 36 as compared with the separator 43 on the medium-separating conveyance path 33. The first medium placement sensor 53 detects whether a medium is placed on the feed tray 5 when the feed tray 5 is located at the feed tray extension position. The second medium placement sensor 54 is disposed between the second feed roller 45 on the medium-reading conveyance path 31 and the switching area 35.

The medium-position detection sensor 55 is disposed between the first feed roller 44 and the lower image reader 51 on the medium-reading conveyance path 31. The medium-position detection sensor 55 detects whether a medium is placed at a medium detection position 56 between the first feed roller 44 and the lower image reader 51 on the medium-reading conveyance path 31 and detects the time when an end of the medium passes through the medium detection position 56.

Figure 7:
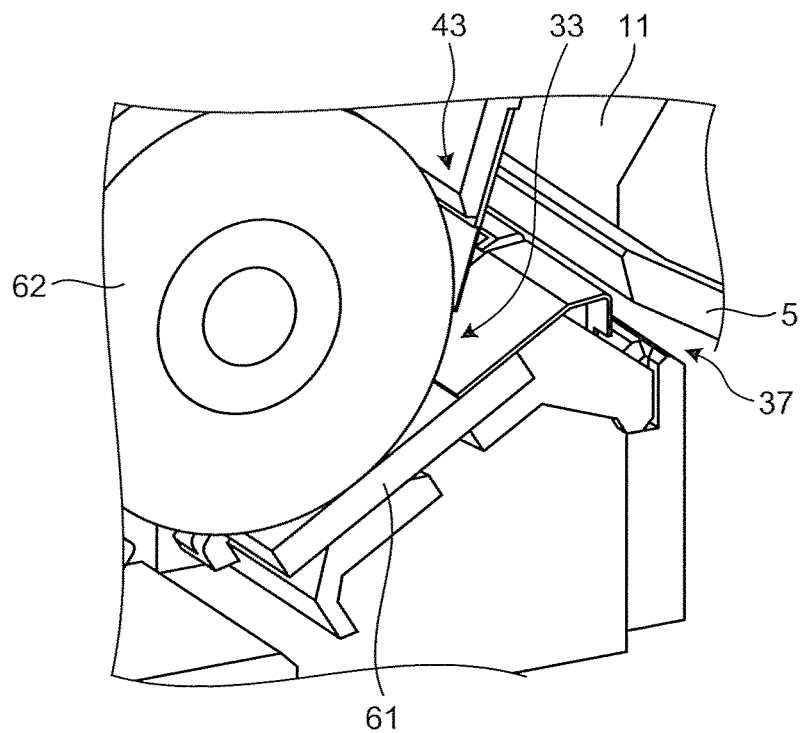
FIG. 7 is a perspective view that illustrates a separator.

FIG. 7 is a perspective view that illustrates the separator 43. The separator 43 includes a friction pad 61 and a pick roller 62. The friction pad 61 is disposed under the medium-separating conveyance path 33 so as to be in contact with a single medium, which is in contact with the feed tray placement surface 11 among multiple media placed on the feed tray 5 when the feed tray 5 is located at the feed tray extension position. The pick roller 62 is formed in a cylindrical shape. The pick roller 62 is disposed in the middle of the medium-separating conveyance path 33 so as to be in contact with a single medium that is located on the far side from the friction pad 61 among multiple media placed on the feed tray 5 when the feed tray 5 is located at the feed tray extension position. The pick roller 62 rotates forward so that a single medium in contact with the pick roller 62 is separated from multiple media placed on the feed tray 5. The pick roller 62 rotates forward so that the separated medium is conveyed toward the meeting point 36 along the medium-separating conveyance path 33 and the separated medium is delivered to the medium-reading conveyance path 31.

Figure 8:
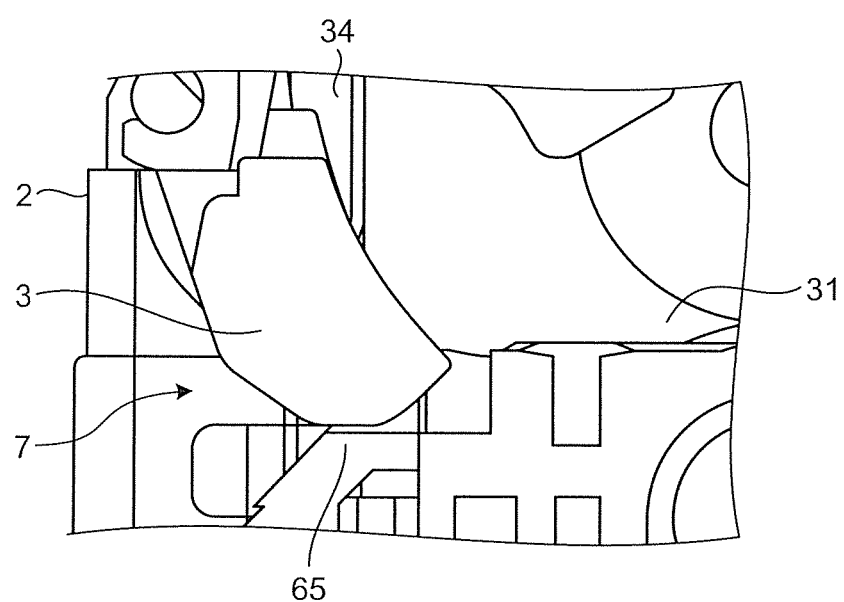
FIG. 8 is a side view that illustrates the switch.

FIG. 8 is a side view that illustrates the switch 3. The switch 3 is disposed in the switching area 35 and is supported by the image reading apparatus main body 2 such that it is rotatable around a rotary shaft 64 so that it is located at the closed position or the opened position. The rotary shaft 64 is parallel to the rotation axis 18. When the switch 3 is located at the opened position, it rotates forward (clockwise in FIG. 8) around the rotary shaft 64 to move toward the closed position. When the switch 3 is located at the closed position, it rotates backward (anticlockwise in FIG. 8) around the rotary shaft 64 to move toward the opened position. The image reading apparatus 1 further includes a rotation stopper 65. The rotation stopper 65 is disposed such that it is in contact with the switch 3 when the switch 3 is located at the closed position, and it is fixed to the image reading apparatus main body 2. The rotation stopper 65 is in contact with the switch 3 when the switch 3 is located at the closed position to prevent rotation of the switch 3 so that the switch 3 is prevented from rotating forward from the closed position.

When the switch 3 is located at the closed position, it guides a medium, conveyed toward the switching area 35 along the medium-reading conveyance path 31, to the medium-discharging conveyance path 34. When the switch 3 is located at the closed position, the image reading apparatus 1 uses the rotation stopper 65 to avoid rotation of the switch 3 so as to prevent the switch 3 from rotating forward from the closed position, whereby it is possible to prevent the switch 3 from moving from the closed position due to the force applied from the medium to the switch 3.

Figure 9:
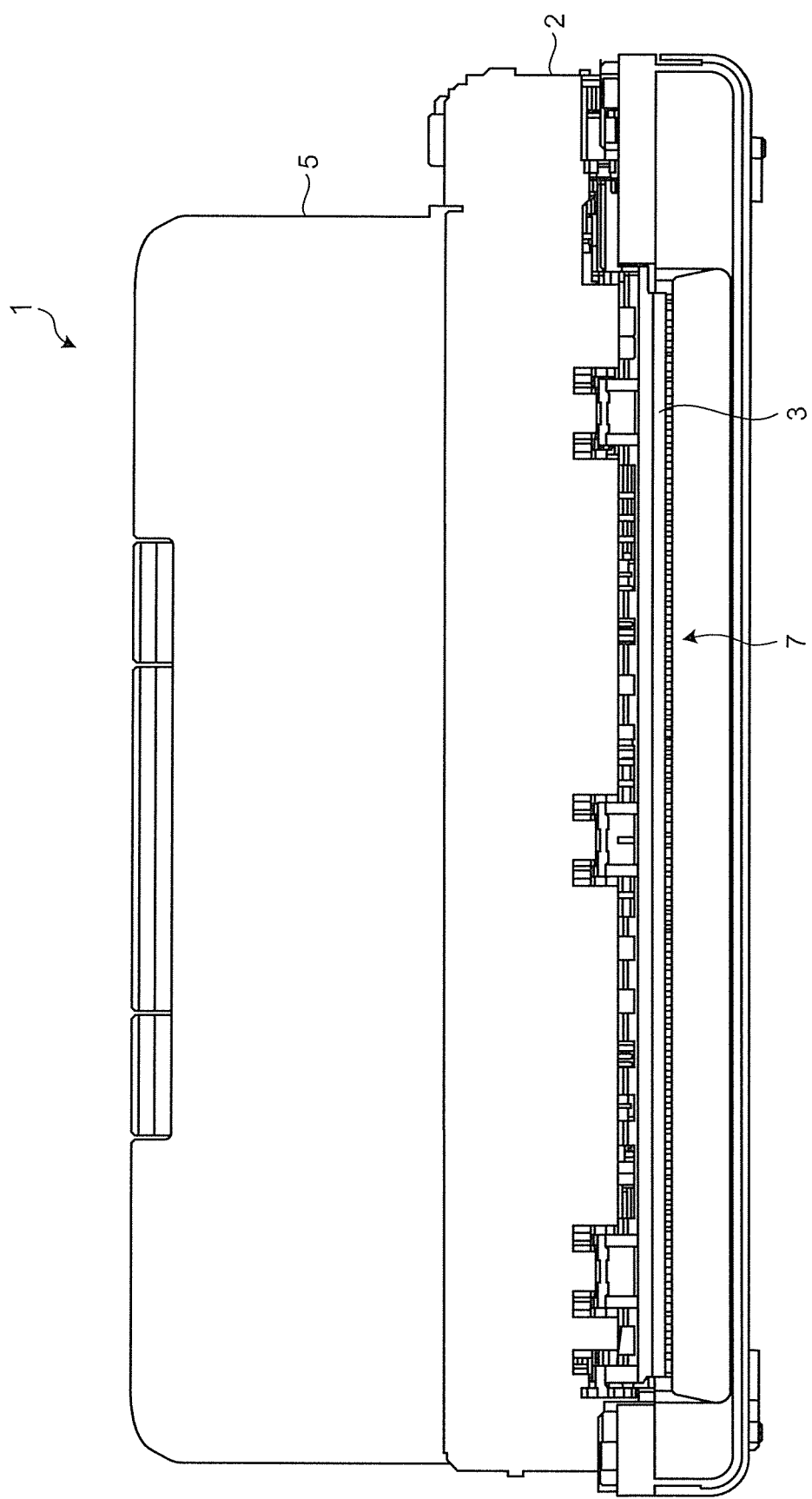
FIG. 9 is a front view that illustrates the image reading apparatus according to the embodiment when the switch is located at the closed position.
Figure 10:
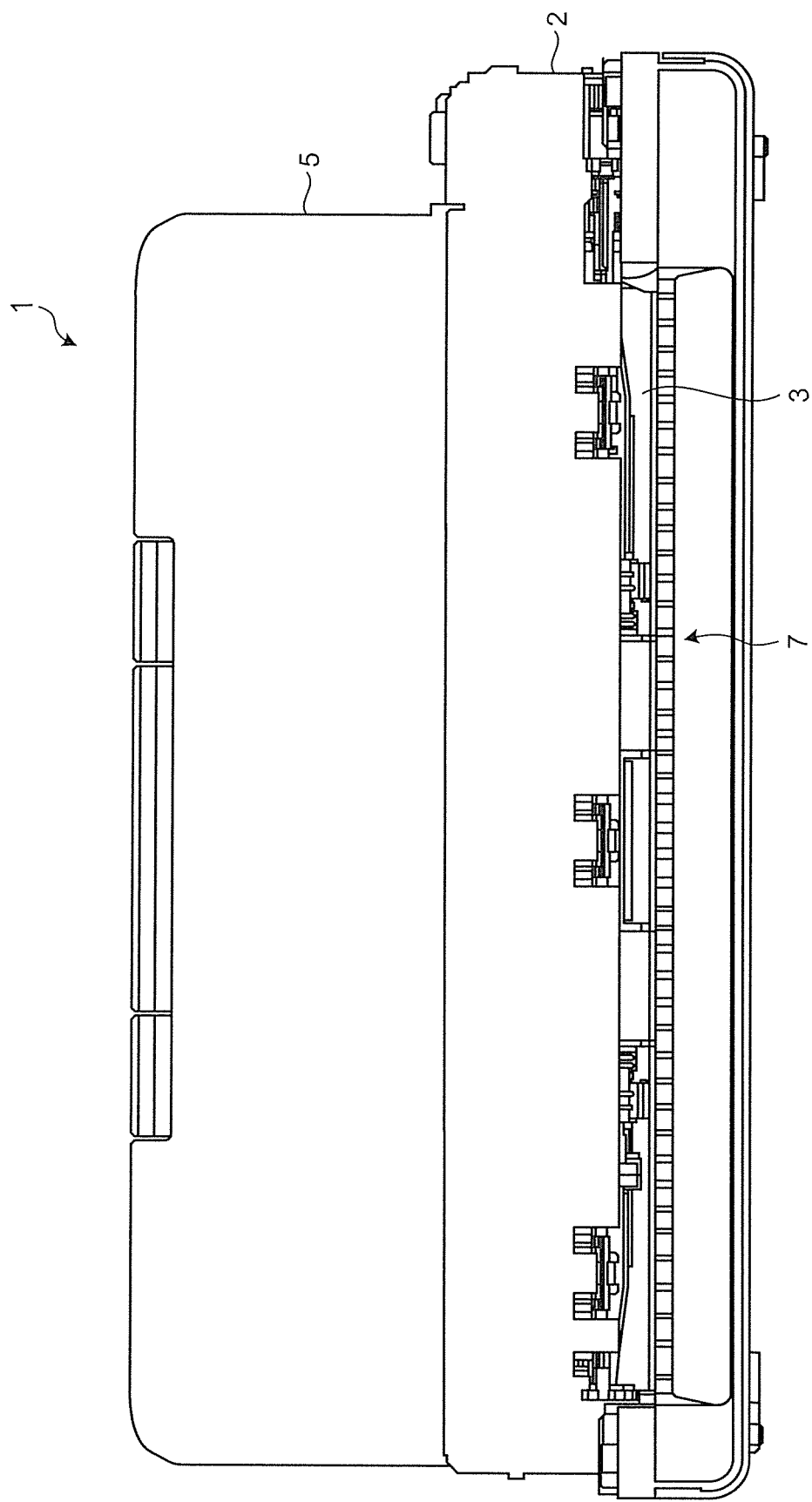
FIG. 10 is a front view that illustrates the image reading apparatus according to the embodiment when the switch is located at the opened position.

FIG. 9 is a front view that illustrates the image reading apparatus 1 according to the embodiment when the switch 3 is located at the closed position. The insertion/discharge port 7 is closed by the switch 3 when the switch 3 is located at the closed position. As the insertion/discharge port 7 is closed when the switch 3 is located at the closed position, the image reading apparatus 1 is capable of preventing a medium from being inserted through the insertion/discharge port 7. FIG. 10 is a front view that illustrates the image reading apparatus 1 according to the embodiment when the switch 3 is located at the opened position. When the switch 3 is located at the opened position, the insertion/discharge port 7 is opened so that the insertion/discharge port 7 is connected to the medium-reading conveyance path 31 through the switching area 35.

Figure 11:
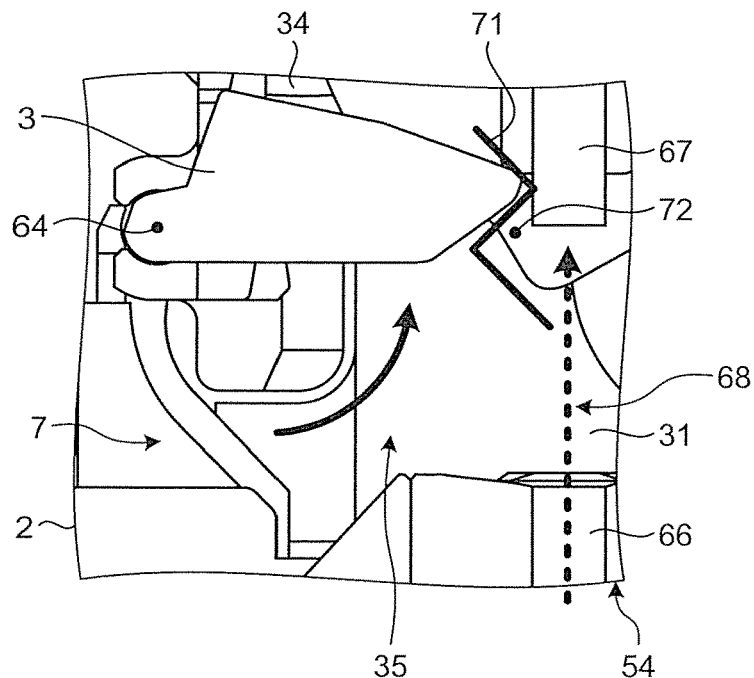
FIG. 11 is a side view that illustrates the switch and a second medium placement sensor.

FIG. 11 is a side view that illustrates the switch 3 and the second medium placement sensor 54. When the switch 3 is located at the opened position, it disconnects the switching area 35 from the medium-discharging conveyance path 34, thereby disconnecting the insertion/discharge port 7 from the medium-discharging conveyance path 34 and disconnecting the medium-reading conveyance path 31 from the medium-discharging conveyance path 34. When the switch 3 is located at the opened position, the insertion/discharge port 7 and the medium-discharging conveyance path 34 are disconnected, whereby the image reading apparatus 1 is capable of preventing a medium inserted through the insertion/discharge port 7 from entering the medium-discharging conveyance path 34. When the switch 3 is located at the opened position, the medium-reading conveyance path 31 and the medium-discharging conveyance path 34 are disconnected, whereby the image reading apparatus 1 is capable of preventing a medium conveyed from the medium-reading conveyance path 31 to the switching area 35 from entering the medium-discharging conveyance path 34.

The second medium placement sensor 54 includes a light emitter 66 and a light receiver 67. The light emitter 66 is disposed under the medium-reading conveyance path 31 and between the second feed roller 45 and the switching area 35. The light emitter 66 emits light toward a medium detection area 68 that is in the medium-reading conveyance path 31 and between the second feed roller 45 and the switching area 35. The light receiver 67 is disposed above the medium-reading conveyance path 31 to receive light that is emitted from the light emitter 66 toward the medium detection area 68. The second medium placement sensor 54 detects that a medium is inserted through the insertion/discharge port 7 when the switch 3 is located at the opened position and the light receiver 67 is not receiving light emitted from the light emitter 66. The second medium placement sensor 54 detects that no medium is being inserted through the insertion/discharge port 7 when the switch 3 is located at the opened position and the light receiver 67 is receiving light emitted from the light emitter 66.

The image reading apparatus 1 further includes a shielding member 71. The shielding member 71 is supported by the image reading apparatus main body 2 such that it is rotatable around a rotary shaft 72 so that it is located at the shielding position or the exposed position. As illustrated in FIG. 11, when the switch 3 is located at the opened position, the shielding member 71 is in contact with the switch 3 to be located at the exposed position. When the shielding member 71 is located at the exposed position, it exposes the light receiver 67 toward the medium detection area 68 and does not disconnect the light emitter 66 from the light receiver 67, whereby the light entering the light receiver 67 from the light emitter 66 is not blocked.

Figure 12:
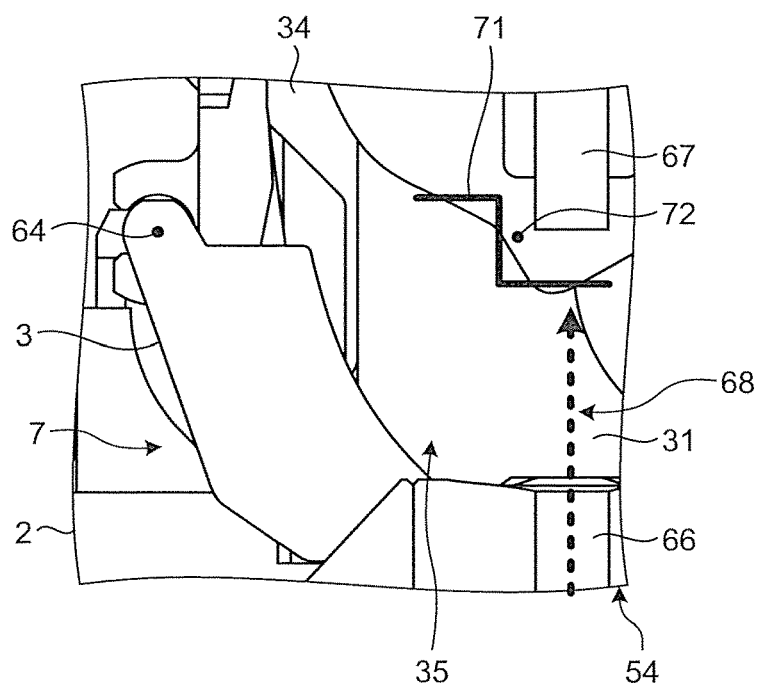
FIG. 12 is a side view that illustrates the second medium placement sensor when the switch is located at the closed position.

FIG. 12 is a side view that illustrates the second medium placement sensor 54 when the switch 3 is located at the closed position. As illustrated in FIG. 12, the shielding member 71 is separated from the switch 3 when the switch 3 is located at the closed position so that it is located at the shielding position due to its own weight. When the shielding member 71 is located at the shielding position, it covers the light receiver 67 and disconnects the light emitter 66 from the light receiver 67, whereby the light entering the light receiver 67 from the light emitter 66 is blocked.

The second medium placement sensor 54 is also used as an open/close sensor that detects whether the switch 3 is located at the closed position or the opened position. The open/close sensor detects that the switch 3 is located at the opened position when the light receiver 67 receives light emitted from the light emitter 66. The open/close sensor detects that the switch 3 is located at the closed position when no medium is placed in the medium detection area 68 and the light receiver 67 is not receiving light emitted from the light emitter 66.

Figure 13:
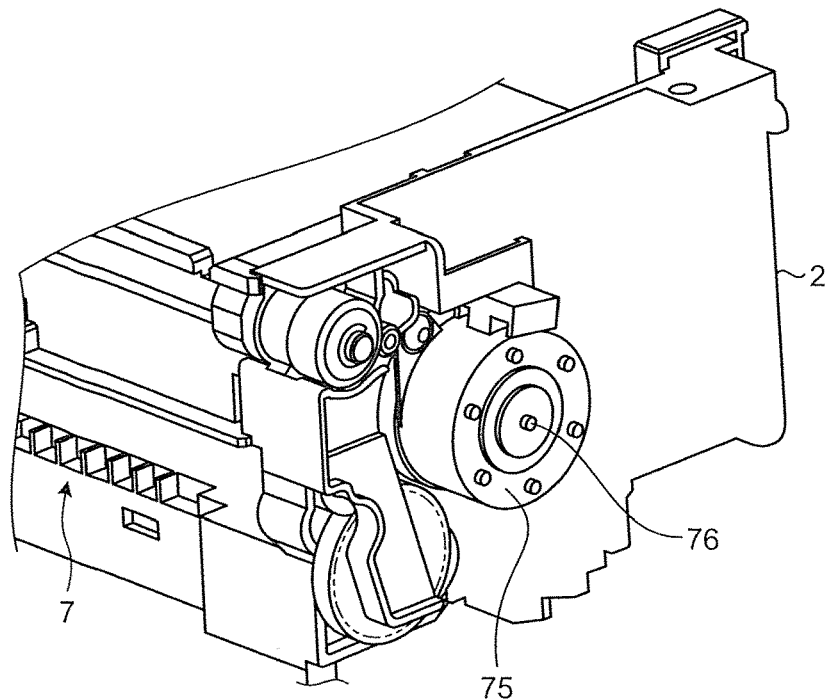
FIG. 13 is a perspective view that illustrates a switch motor.
Figure 14:
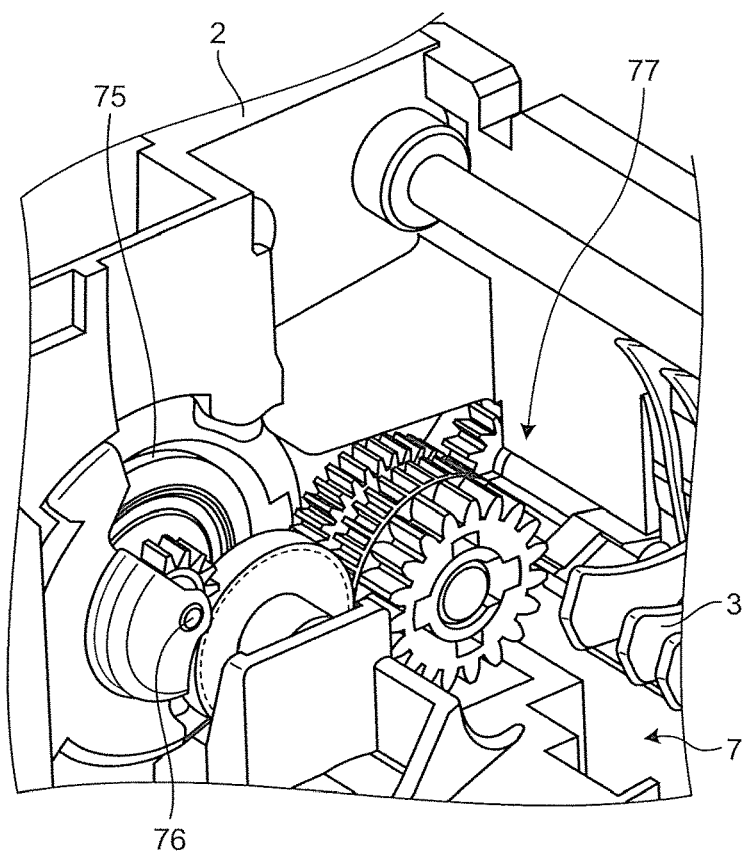
FIG. 14 is a perspective view that illustrates a first gear train.

As illustrated in FIG. 13, the image reading apparatus 1 further includes a switch motor 75 and a drive shaft 76. FIG. 13 is a perspective view that illustrates the switch motor 75. The switch motor 75 causes the drive shaft 76 to rotate forward or rotate backward. As illustrated in FIG. 14, the image reading apparatus 1 further includes a first gear train 77. FIG. 14 is a perspective view that illustrates the first gear train 77. The first gear train 77 is composed of a plurality of gears engaging with each other; one of the gears is fixed to the drive shaft 76, and the other one of the gears is fixed to the switch 3. The first gear train 77 converts the rotary movement of the drive shaft 76 into the rotary movement of the switch 3 to rotate forward the switch 3 when the drive shaft 76 is rotated forward and rotate backward the switch 3 when the drive shaft 76 is rotated backward.

Figure 15:
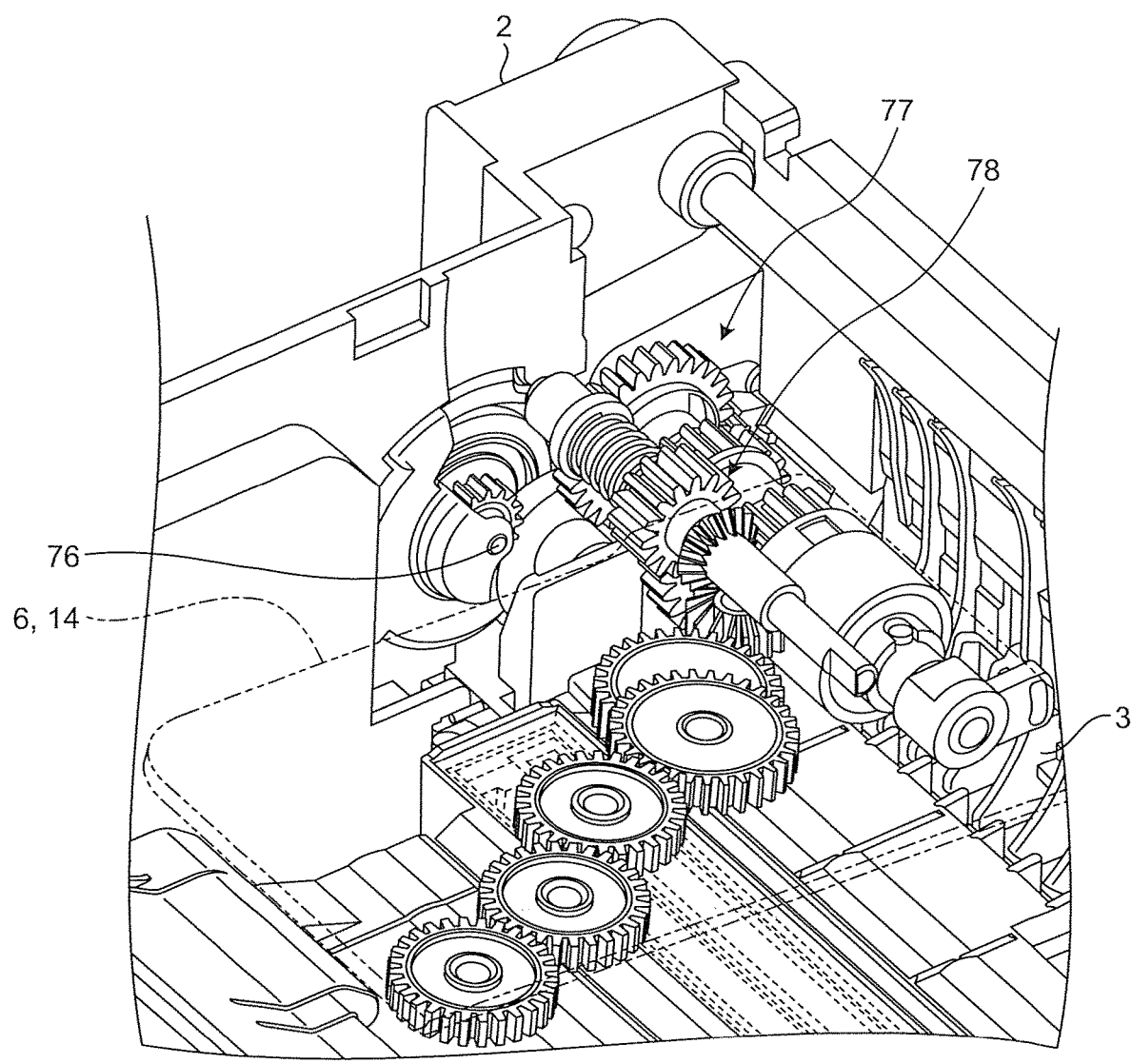
FIG. 15 is a perspective view that illustrates a second gear train.

As illustrated in FIG. 15, the image reading apparatus 1 further includes a second gear train 78. FIG. 15 is a perspective view that illustrates the second gear train 78. The second gear train 78 is composed of a plurality of gears engaging with each other; one of the gears is engaged with one of the gears in the first gear train 77, and the other one of the gears is fixed to the first exit tray member 14. The second gear train 78 converts the rotary movement of the drive shaft 76 into the rotary movement of the first exit tray member 14 to rotate forward the first exit tray member 14 when the drive shaft 76 is rotated forward and to rotate backward the first exit tray member 14 when the drive shaft 76 is rotated backward. The second gear train 78 is formed such that, when the switch 3 is located at the opened position, the first exit tray member 14 is located at the exit tray retraction position.

Figure 16:
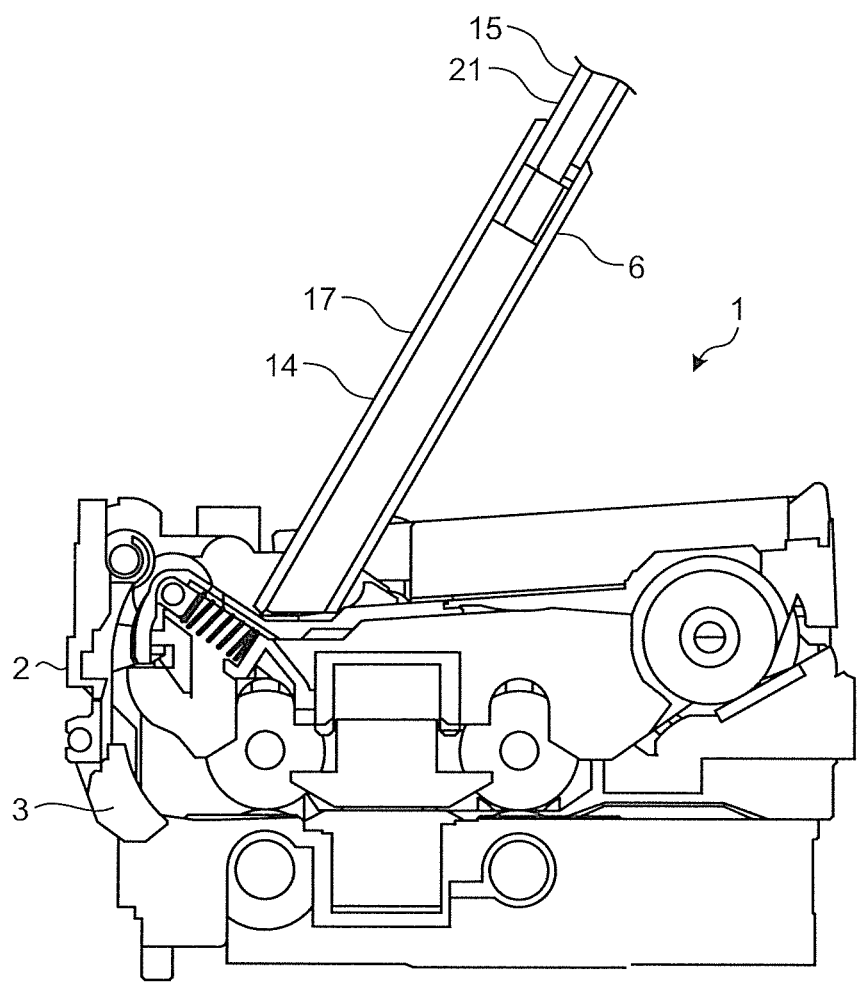
FIG. 16 is a sectional side view that illustrates the first exit tray member when the switch is located at the closed position.

FIG. 16 is a sectional side view that illustrates the first exit tray member 14 when the switch 3 is located at the closed position. The first exit tray member 14 is located at the exit tray extension position when the switch 3 is located at the closed position. That is, the second gear train 78 is formed such that, when the switch 3 is located at the closed position, the first exit tray member 14 is located at the exit tray extension position.

Figure 17:
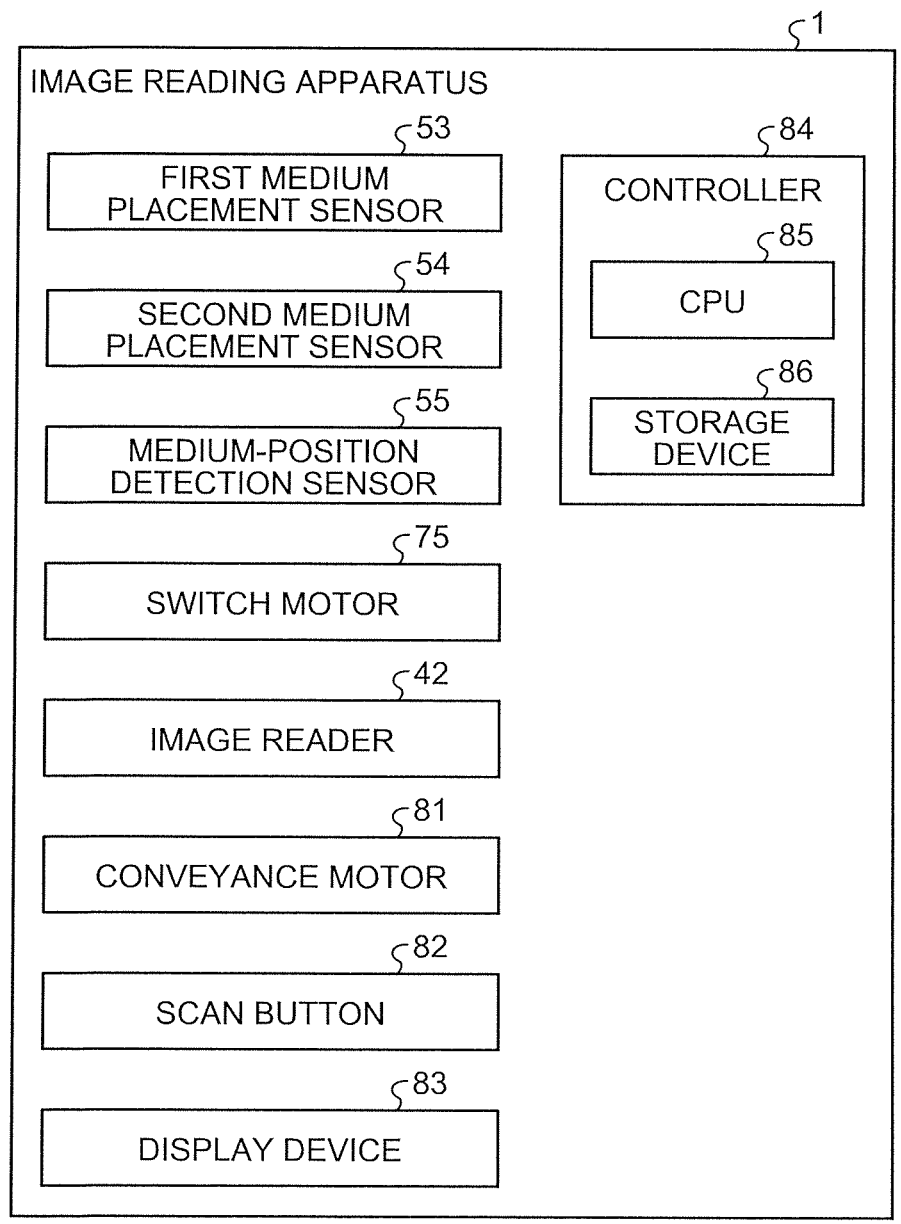
FIG. 17 is a block diagram that illustrates the image reading apparatus according to the embodiment.

FIG. 17 is a block diagram that illustrates the image reading apparatus 1 according to the embodiment. The image reading apparatus 1 further includes a conveyance motor 81, a scan button 82, a display device 83, and a controller 84. Under the control of the controller 84, the conveyance motor 81 causes the first feed roller 44, the second feed roller 45, the third feed roller 46, and the pick roller 62 to rotate forward or backward. The scan button 82 is provided in the image reading apparatus main body 2; it detects whether it has been pressed by a user and outputs a detection result to the controller 84. Under the control of the controller 84, the display device 83 displays a message generated by the controller 84.

The controller 84 is a computer, and it includes a CPU (Central Processing Unit) 85 and a storage device 86. The CPU 85 executes a computer program installed in the controller 84 to perform information processing and controls the storage device 86. The CPU 85 further controls the first medium placement sensor 53, the second medium placement sensor 54, the medium-position detection sensor 55, the switch motor 75, the image reader 42, the conveyance motor 81, the scan button 82, and the display device 83. Examples of the storage device 86 include a memory such as RAM or ROM, a fixed disk device such as hard disk, or SSD (Solid State Drive). The storage device 86 stores a computer program installed in the controller 84 and stores information used by the CPU 85.

For example, the controller 84 controls the first medium placement sensor 53 so as to detect whether a medium is placed on the feed tray 5. The controller 84 controls the second medium placement sensor 54 so as to detect whether a medium is placed in the medium detection area 68 when the switch 3 is located at the opened position. The controller 84 controls the second medium placement sensor 54 so as to detect whether the switch 3 is located at the closed position.

The controller 84 controls the medium-position detection sensor 55 so as to detect whether a medium is placed at the medium detection position 56.

The controller 84 controls the switch motor 75 so as to locate the switch 3 at the opened position or the closed position. The controller 84 controls the image reader 42 so as to capture an image on the medium conveyed along the medium-reading conveyance path 31. The controller 84 controls the conveyance motor 81 so as to rotate forward or backward the first feed roller 44, the second feed roller 45, the third feed roller 46, and the pick roller 62. The controller 84 controls the scan button 82 so as to detect whether the scan button 82 has been pressed. The controller 84 controls the display device 83 so as to display a predetermined message on the display device 83.

Operation of the Image Reading Apparatus 1

Figure 18:
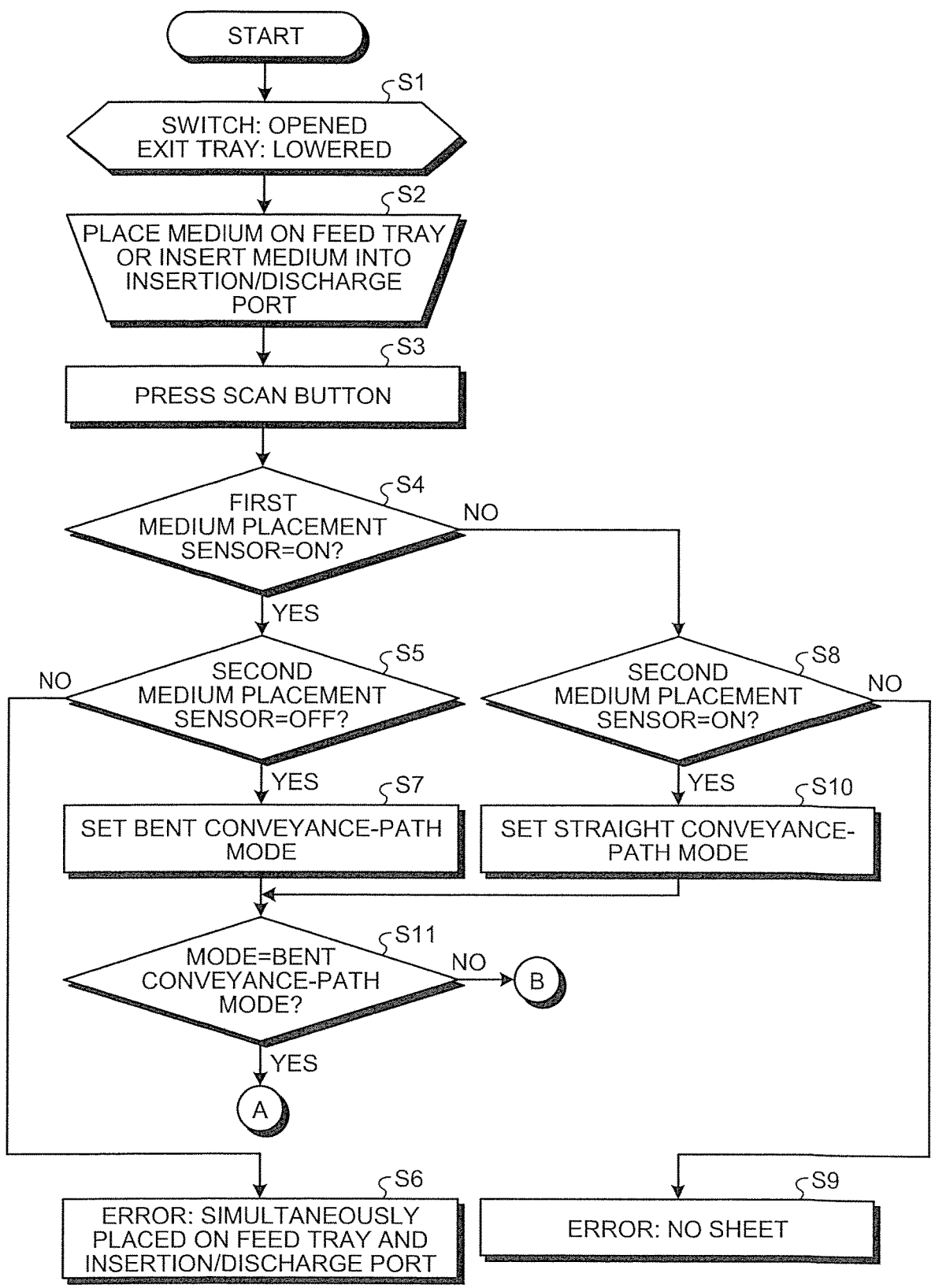
FIG. 18 is a flowchart that illustrates an operation of the image reading apparatus according to the embodiment.
Figure 19:
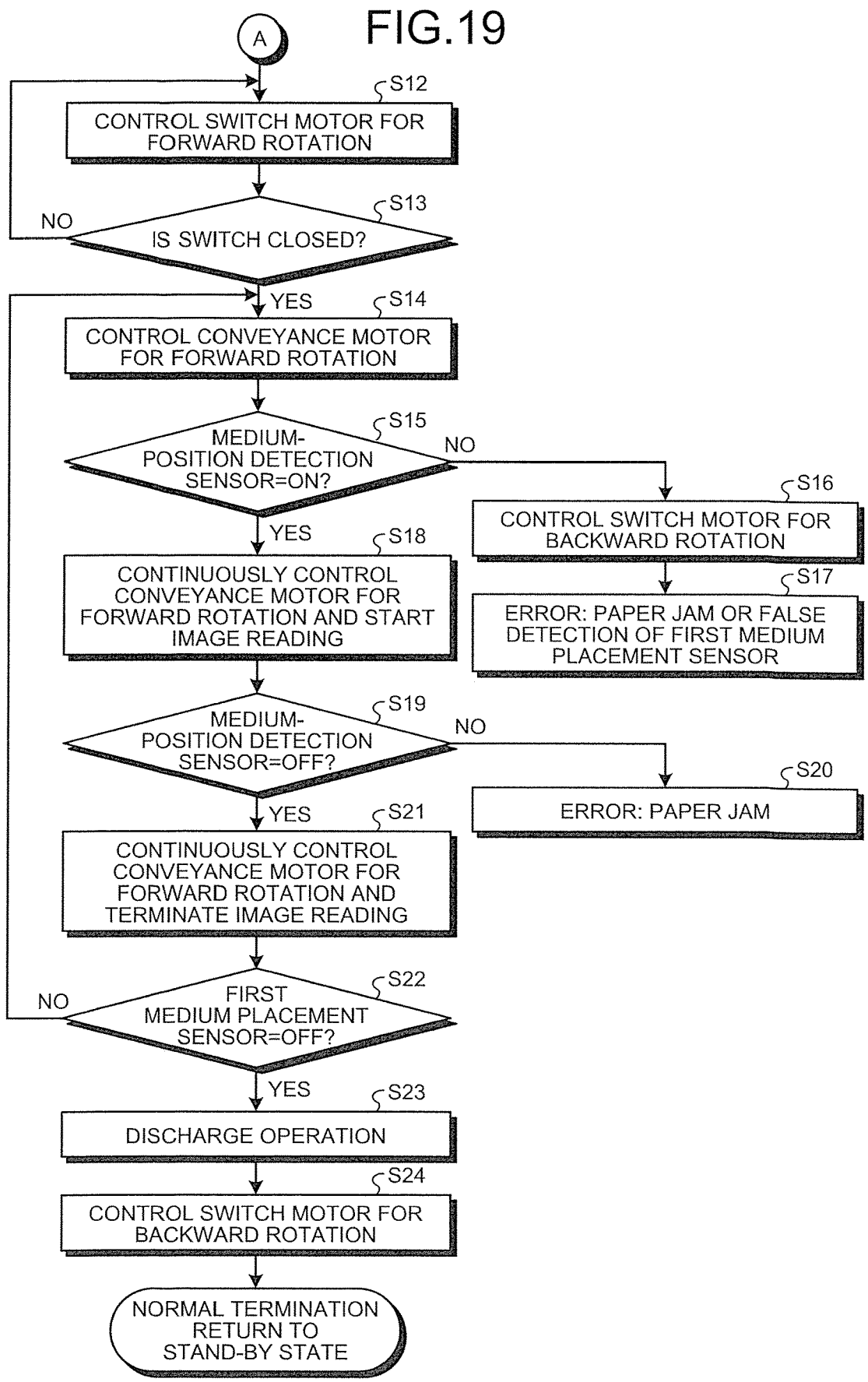
FIG. 19 is another flowchart that illustrates an operation of the image reading apparatus according to the embodiment.
Figure 20:
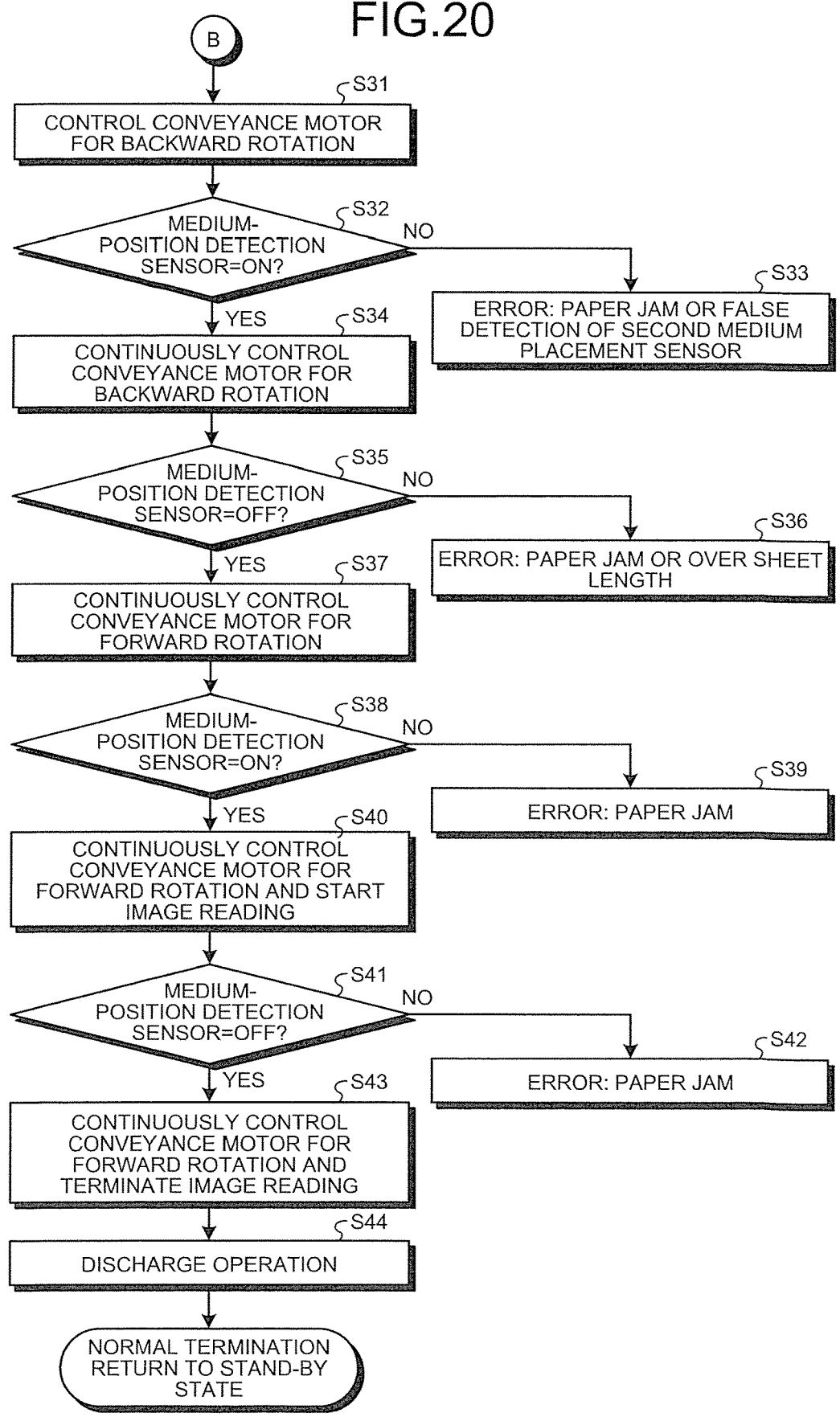
FIG. 20 is further another flowchart that illustrates an operation of the image reading apparatus according to the embodiment.

FIG. 18 is a flowchart that illustrates an operation of the image reading apparatus 1 according to the embodiment. FIG. 19 is another flowchart that illustrates an operation of the image reading apparatus 1 according to the embodiment. FIG. 20 is further another flowchart that illustrates an operation of the image reading apparatus 1 according to the embodiment. A user starts up the image reading apparatus 1 to read the image on a medium by using the image reading apparatus 1. After the image reading apparatus 1 is activated, the controller 84 controls the switch motor 75 to rotate forward the drive shaft 76, locate the switch 3 at the opened position, and locate the first exit tray member 14 at the exit tray retraction position. The insertion/discharge port 7 is opened when the switch 3 is located at the opened position. When the first exit tray member 14 is located at the exit tray retraction position, the exit tray 6 is shortened and retracted such that it conforms to the upper surface of the image reading apparatus main body 2 (Step S1).

To read the image on a single thick medium by using the image reading apparatus 1, a user inserts the thick medium into the insertion/discharge port 7 such that the thick medium is brought into contact with the second feed roller 45 and the second pressure roller 48. The thick medium is a medium that is difficult to be bent or that easily has a tendency to be bent, and examples thereof are resin cards and booklets. Examples of the card include credit cards and cash cards. Examples of the booklet include passports and bankbooks. As the switch 3 is located at the opened position, the image reading apparatus 1 prevents a thick medium from entering the medium-discharging conveyance path 34 and allows a thick medium to be properly guided such that the thick medium is brought into contact with the second feed roller 45 and the second pressure roller 48.

To read the image on a single thin medium by using the image reading apparatus 1, the user places the single thin medium on the feed tray 5. The thin medium is a medium that is easily bent, and examples thereof include copy paper. Furthermore, to read images of multiple thin media by using the image reading apparatus 1, the user places the thin media on the feed tray 5 (Step S2). As the feed tray 5 is tilted, the thin medium placed on the feed tray 5 moves toward the meeting point along the medium-separation conveyance path 33 due to its own weight and is brought into contact with the friction pad 61 and the pick roller 62 in the separator 43. After inserting the medium into the insertion/discharge port 7 or placing the medium on the feed tray 5, the user presses the scan button 82 (Step S3).

After having detected that the scan button 82 has been pressed, the controller 84 controls the first medium placement sensor 53 so as to detect whether a medium is placed on the feed tray 5 (Step S4). When it is detected that a medium is placed on the feed tray 5 (Step S4, Yes), the controller 84 controls the second medium placement sensor 54 so as to detect whether a medium has been inserted into the insertion/discharge port 7 (Step S5). When it is detected that a medium has been inserted into the insertion/discharge port 7 (Step S5, No), the controller 84 controls the display device 83 so as to display an error message indicating that media are placed both on the feed tray 5 and in the insertion/discharge port 7 (Step S6). When it is detected that no medium has been inserted into the insertion/discharge port 7 (Step S5, Yes), the controller 84 selects a bent conveyance-path mode (Step S7).

When it is detected that no medium is placed on the feed tray 5 (Step S4, No), the controller 84 controls the second medium placement sensor 54 to detect whether a medium has been inserted into the insertion/discharge port 7 (Step S8). When it is detected that no medium has been inserted into the insertion/discharge port 7 (Step S8, No), the controller 84 causes the display device 83 to display an error message indicating that media are placed neither on the feed tray 5 nor in the insertion/discharge port 7 (Step S9). When it is detected that a medium has been inserted into the insertion/discharge port 7 (Step S8, Yes), the controller 84 selects a straight conveyance-path mode (Step S10).

When the bent conveyance-path mode is selected (Step S11, Yes), the controller 84 controls the switch motor 75 so as to rotate forward the switch 3 and move the switch 3 toward the closed position (Step S12). In accordance with the movement of the switch 3 toward the closed position, the first exit tray member 14 moves toward the exit tray extension position and the exit tray 6 extends. After rotating forward the switch 3, the controller 84 controls the second medium placement sensor 54 so as to detect whether the switch 3 is located at the closed position (Step S13).

When the switch 3 is located at the closed position (Step S13, Yes), the controller 84 stops driving of the switch motor 75. When the switch 3 is located at the closed position, the controller 84 further controls the conveyance motor 81 so as to rotate forward the first feed roller 44, the second feed roller 45, the third feed roller 46, and the pick roller 62 (Step S14). Due to the forward rotation of the pick roller 62, a single medium in contact with the pick roller 62 among the media placed on the feed tray 5 is conveyed along the medium-separating conveyance path 33 and delivered to the medium-reading conveyance path 31 through the meeting point 36. The medium delivered to the medium-reading conveyance path 31 is conveyed along the medium-reading conveyance path 31 in accordance with the forward rotation of the first feed roller 44 and the second feed roller 45.

After the conveyance motor 81 is driven, the controller 84 controls the medium-position detection sensor 55 so as to detect whether a medium is placed on the medium detection position 56 (Step S15). When it is not detected that a medium is placed at the medium detection position 56 before a predetermined time has elapsed after the conveyance motor 81 was driven (Step S15, No), the controller 84 controls the switch motor 75 so as to rotate backward the drive shaft 76 (Step S16). Due to the backward rotation of the drive shaft 76, the switch 3 is located at the opened position, and the exit tray 6 is shortened and retracted. After rotating backward the drive shaft 76, the controller 84 causes the display device 83 to display an error message indicating paper jam or false detection (Step S17).

When it is detected that a medium is placed at the medium detection position 56 (Step S15, Yes), the controller 84 continuously rotates forward the first feed roller 44, the second feed roller 45, the third feed roller 46, and the pick roller 62. When it is detected that a medium is placed at the medium detection position 56 (Step S15, Yes), the controller 84 further controls the image reader 42 so as to start to capture the image on the medium conveyed along the medium-reading conveyance path 31 (Step S18).

When it is detected that the trailing edge of the medium has not passed through the medium detection position 56 before a predetermined time period has elapsed after image capturing started (Step S19, No), the controller 84 causes the display device 83 to display an error message indicating paper jam (Step S20). When it is detected that the trailing edge of the medium has passed through the medium detection position 56 (Step S19, Yes), the controller 84 continuously rotates forward the second feed roller 45 and the third feed roller 46. The controller 84 terminates image capturing on the medium conveyed along the medium-reading conveyance path 31 after the trailing edge of the medium has passed through the medium detection position 56 and then a predetermined time has elapsed (Step S21).

After image capturing on the medium is finished, the controller 84 detects whether a medium is placed on the feed tray 5 (Step S22). When it is detected that a medium is placed on the feed tray 5 (Step S22, No), the controller 84 repeatedly performs the process from Step S14 to Step S22.

When it is detected that no medium is placed on the feed tray 5 (Step S22, Yes), the controller 84 rotates forward the second feed roller 45 and the third feed roller 46 until a predetermined time has elapsed after the trailing edge of the medium passed through the medium detection area 68. By rotating forward the second feed roller 45 and the third feed roller 46 until the predetermined time has elapsed, the captured medium is placed on the exit tray 6. The controller 84 stops rotating forward the first feed roller 44, the second feed roller 45, the third feed roller 46, and the pick roller 62 after the trailing edge of the medium has passed through the medium detection area 68 and then the predetermined time has elapsed (Step S23). After stopping the forward rotation, the controller 84 rotates backward the switch 3 to set the switch 3 in the opened position and then retract the exit tray 6 (Step S24).

When the straight conveyance-path mode is set (Step S11, No), the controller 84 controls the conveyance motor 81 so as to rotate backward the first feed roller 44 and the second feed roller 45 (Step S31). The backward rotation of the first feed roller 44 and the second feed roller 45 causes the medium inserted through the insertion/discharge port 7 to be conveyed toward the meeting point 36 along the medium-reading conveyance path 31. After the first feed roller 44 and the second feed roller 45 are rotated backward, the controller 84 controls the medium-position detection sensor 55 to detect whether the leading edge of the medium has passed through the medium detection position 56 (Step S32). When it is detected that no medium has passed through the medium detection position 56 although the predetermined time has elapsed after the backward rotation of the second feed roller 45 (Step S32, No), the controller 84 causes the display device 83 to display an error message indicating paper jam or false detection (Step S33).

When it is detected that the leading edge of the medium has passed through the medium detection position 56 (Step S32, Yes), the controller 84 continuously rotates backward the first feed roller 44 and the second feed roller 45 (Step S34). When it is detected that the trailing edge of the medium has not passed through the medium detection position 56 before the predetermined time has elapsed after the leading edge of the medium passed through the medium detection position 56 (Step S35, No) the controller 84 causes the display device 83 to display an error message indicating paper jam or over sheet length (Step S36).

When it is detected that the trailing edge of the medium has passed through the medium detection position 56 (Step S35, Yes), the controller 84 rotates forward the first feed roller 44 and the second feed roller 45 (Step S37). After being conveyed toward the meeting point 36 along the medium-reading conveyance path 31, the medium is conveyed toward the switching area 35 along the medium-reading conveyance path 31 due to the forward rotation of the first feed roller 44 and the second feed roller 45. The controller 84 detects whether the medium is located on the medium detection position 56 after the first feed roller 44 is rotated forward (Step S38).

When it is detected that the leading edge of the medium has not passed through the medium detection position 56 before the predetermined time has elapsed after the first feed roller 44 was rotated forward (Step S38, No), the controller 84 causes the display device 83 to display an error message indicating paper jam (Step S39).

When it is detected that the leading edge of the medium has passed through the medium detection position 56 after the forward rotation of the first feed roller 44 (Step S38, Yes), the controller 84 continuously rotates forward the first feed roller 44 and the second feed roller 45. Furthermore, the controller 84 starts to capture an image on the medium conveyed along the medium-reading conveyance path 31 after the leading edge of the medium has passed through the medium detection position 56 and then the predetermined time has elapsed (Step S40). After image capturing on the medium is started, the controller 84 detects whether the trailing edge of the medium has passed through the medium detection position 56 (Step S41).

When it is detected that the trailing edge of the medium has not passed through the medium detection position 56 before the predetermined time has elapsed after the leading edge of the medium passed through the medium detection position 56 (Step S41, No), the controller 84 causes the display device 83 to display an error message indicating paper jam (Step S42).

If it is detected that the trailing edge of the medium has passed through the medium detection position 56 (Step S41, Yes), the controller 84 terminates image capturing on the medium after the trailing edge of the medium has passed through the medium detection position 56 and then the predetermined time has elapsed (Step S43). As the switch 3 is located at the opened position, the medium, conveyed toward the switching area 35 along the medium-reading conveyance path 31, is prevented from entering the medium-discharging conveyance path 34 so that it is properly guided to the insertion/discharge port 7. The medium conveyed toward the switching area 35 along the medium-reading conveyance path 31 is discharged through the insertion/discharge port 7 due to the forward rotation of the second feed roller 45.

Advantage of the Image Reading Apparatus 1

The image reading apparatus 1 according to the embodiment includes the medium-reading conveyance path 31, the medium-discharging conveyance path 34, the insertion/discharge port 7, the image reader 42, and the switch 3. The image reader 42 reads the image on a medium conveyed along the medium-reading conveyance path 31. The switch 3 is supported by the image reading apparatus main body 2 in a movable manner so as to be located at the opened position or the closed position. When the switch 3 is located at the opened position, it disconnects the medium-reading conveyance path 31 from the medium-discharging conveyance path 34 and connects the insertion/discharge port 7 and the medium-reading conveyance path 31. When the switch 3 is located at the closed position, it disconnects the insertion/discharge port 7 from the medium-reading conveyance path 31 and connects the medium-reading conveyance path 31 and the medium-discharging conveyance path 34.

When the switch 3 is located at the opened position, the image reading apparatus 1 may prevent the medium from being conveyed from the medium-reading conveyance path 31 to the medium-discharging conveyance path 34 and allow the medium to be properly conveyed from the medium-reading conveyance path 31 to the insertion/discharge port 7. Furthermore, when the switch 3 is located at the closed position, the image reading apparatus 1 may prevent the medium from being conveyed from the medium-reading conveyance path 31 to the insertion/discharge port 7 and allow the medium to be properly conveyed from the medium-reading conveyance path 31 to the medium-discharging conveyance path 34.

Furthermore, the image reading apparatus 1 according to the embodiment further includes the rotation stopper 65. The rotation stopper 65 is disposed such that it is separated from the switch 3 when the switch 3 is located at the opened position and it is in contact with the switch 3 when the switch 3 is located at the closed position, and it is fixed to the image reading apparatus main body 2.

The image reading apparatus 1 may prevent the switch 3 from being moved from the closed position due to the force applied from the medium to the switch 3 when the switch 3 is located at the closed position. By preventing the switch 3 from being moved from the closed position, the image reading apparatus 1 prevents the connection between the medium-reading conveyance path 31 and the insertion/discharge port 7 so as to properly guide the medium from the medium-reading conveyance path 31 to the medium-discharging conveyance path 34. Moreover, although the above-described image reading apparatus 1 according to the embodiment is provided with the rotation stopper 65, the rotation stopper 65 may be omitted when the medium is properly guided by the switch 3 from the medium-reading conveyance path 31 to the medium-discharging conveyance path 34.

Furthermore, the image reading apparatus 1 according to the embodiment further includes the conveyer 41. When the switch 3 is located at the opened position, the conveyer 41 conveys the medium, inserted through the insertion/discharge port 7, to the medium-reading conveyance path 31 or discharges the medium, conveyed through the medium-reading conveyance path 31, through the insertion/discharge port 7. Furthermore, when the switch 3 is located at the closed position, the conveyer 41 conveys the medium from the medium-reading conveyance path 31 to the medium-discharging conveyance path 34. Even when the medium is conveyed from the insertion/discharge port 7 to the medium-reading conveyance path 31, the image reading apparatus 1 prevents the medium from entering the medium-discharging conveyance path 34 from the insertion/discharge port 7, thereby properly conveying the medium.

Furthermore, the image reading apparatus 1 according to the embodiment further includes the switch motor 75 that locates the switch 3 at the opened position or the closed position. This eliminates the need for a user to manually locate the switch 3 at the opened position or the closed position, whereby the image reading apparatus 1 may facilitate the user's operation.

Furthermore, the image reading apparatus 1 according to the embodiment further includes the first exit tray member 14 and the second gear train 78. The first exit tray member 14 is supported by the image reading apparatus main body 2 in a movable manner so as to be located at the exit tray extension position or the exit tray retraction position. The second gear train 78 converts the rotary movement of the switch 3 into the rotary movement of the first exit tray member 14 so that the first exit tray member 14 moves to the exit tray retraction position when the switch 3 moves to the opened position. Furthermore, the second gear train 78 converts the rotary movement of the switch 3 into the rotary movement of the first exit tray member 14 so that the first exit tray member 14 moves to the exit tray extension position when the switch 3 moves to the closed position. The medium discharged through the medium-discharging conveyance path 34 is placed on the first exit tray member 14 when the first exit tray member 14 is located at the exit tray extension position.

The image reading apparatus 1 may reduce the number of components and reduce costs of manufacturing as there is no need to provide the actuator for moving the first exit tray member 14 separately from the switch motor 75 for moving the switch 3. Although the above-described image reading apparatus 1 according to the embodiment is provided with the second gear train 78, the second gear train 78 may be omitted. When the second gear train 78 is omitted from the image reading apparatus 1, the first exit tray member 14 is manually moved by a user or is moved by an actuator different from the switch motor 75.

Furthermore, the image reading apparatus 1 according to the embodiment further includes the feed tray 5, the first medium placement sensor 53, and the controller 84. The feed tray 5 is connected to the medium-reading conveyance path 31. The first medium placement sensor 53 detects whether a medium is placed on the feed tray 5. When it is detected that a medium is placed on the feed tray 5, the controller 84 controls the switch motor 75 so that the switch 3 is located at the closed position. Furthermore, the controller 84 controls the conveyer 41 so as to convey the medium from the feed tray 5 to the medium-discharging conveyance path 34 through the medium-reading conveyance path 31.

Thus, the user does not need to determine whether the switch 3 is to be manually located at the opened position or the closed position, whereby the image reading apparatus 1 may facilitate the user's operation. Although the above-described controller 84 locates the switch 3 at the closed position or the opened position in accordance with a detection result of the first medium placement sensor 53, the switch 3 may be located at the closed position or the opened position in accordance with the user's operation.

Furthermore, the image reading apparatus 1 according to the embodiment further includes the open/close sensor that detects whether the switch 3 is located at the opened position or the closed position. The controller 84 controls the conveyer 41 so as to convey the medium from the medium-reading conveyance path 31 to the medium-discharging conveyance path 34 after it is detected that the switch 3 is located at the closed position. Here, the image reading apparatus 1 may quickly start to convey the medium from the medium-reading conveyance path 31 to the medium-discharging conveyance path 34 whereas it stands by sufficiently until the switch 3 is moved to the closed position, whereby an image on the medium may be captured at high speed. Although the image reading apparatus 1 according to the above-described embodiment starts to convey a medium after it is detected that the switch 3 is located at the opened position, it may start to convey the medium after it stands by sufficiently until the switch 3 is moved to the closed position. In this case, too, the image reading apparatus 1 is capable of properly conveying the medium to the switched conveyance path.

Furthermore, the image reading apparatus 1 according to the embodiment further includes the second medium placement sensor 54 that detects whether a medium has been inserted through the insertion/discharge port 7. When it is detected that a medium has been inserted through the insertion/discharge port 7, the controller 84 controls the conveyer 41 so that the medium, inserted through the insertion/discharge port 7, is conveyed from the insertion/discharge port 7 to the medium-reading conveyance path 31. Here, the user does not need to give input to the image reading apparatus 1 as to whether an image on the medium inserted through the insertion/discharge port 7 is to be read or an image on the medium placed on the feed tray 5 is to be read, whereby the user's operation may be facilitated. Although the image reading apparatus 1 according to the above-described embodiment determines the direction in which the medium is conveyed in accordance with a detection result of the second medium placement sensor 54, the direction may be determined in accordance with the user's operation. In this case, too, the image reading apparatus 1 is capable of properly conveying the medium to the switched conveyance path.

Furthermore, the second medium placement sensor 54 in the image reading apparatus 1 according to the embodiment detects that a medium has not been inserted through the insertion/discharge port 7 when the light passing through the medium detection area 68 is detected and detects that a medium has been inserted through the insertion/discharge port 7 when the light is not detected. The image reading apparatus 1 further includes the shielding member 71. The shielding member 71 does not block the light when the switch 3 is located at the opened position, and it blocks the light when the switch 3 is located at the closed position. Here, the open/close sensor detects that the switch 3 is located at the opened position when the second medium placement sensor 54 detects the light.

The image reading apparatus 1 enables a reduction in the number of components and costs of manufacturing as the second medium placement sensor 54 is also used as the open/close sensor. Although the image reading apparatus 1 according to the above-described embodiment uses the second medium placement sensor 54 to detect the position where the switch 3 is located, the position of the switch 3 is detectable by a different open/close sensor that does not use the second medium placement sensor 54. In this case, too, the image reading apparatus 1 is capable of properly conveying the medium to the switched conveyance path.

Furthermore, the image reader 42 in the image reading apparatus 1 according to the embodiment captures an image on a medium when the medium is inserted through the insertion/discharge port 7 and is conveyed toward the insertion/discharge port 7 along the medium-reading conveyance path 31. Here, in the image reading apparatus 1, the direction in which the medium, inserted through the insertion/discharge port 7, is conveyed during image reading is the same as the direction in which the medium, placed on the feed tray 5, is conveyed during image reading. This allows the image reading apparatus 1 to properly read both an image on the medium inserted through the insertion/discharge port 7 and an image on the medium placed on the feed tray.

The image reading apparatus according to the disclosure makes it possible to properly convey a medium along the switched conveyance path.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. An image reading apparatus comprising:
    a first conveyance path;
    a second conveyance path;
    an insertion/discharge port;
    an image reader that reads an image on a medium conveyed along the first conveyance path;
    a switch that is located at a first position or a second position;
    a conveyer that conveys a medium inserted through the insertion/discharge port to the first conveyance path or discharges a medium conveyed along the first conveyance path through the insertion/discharge port when the switch is located at the first position;
    an actuator that locates the switch at the first position or the second position;
    an exit tray that is located at a third position or a fourth position; and
    a gear mechanism that converts a movement of the switch into a movement of the exit tray, moves the exit tray toward the third position when the switch is moved toward the first position and moves the exit tray toward the fourth position when the switch is moved toward the second position,
    wherein the switch
        disconnects the first conveyance path from the second conveyance path and connects the insertion/discharge port and the first conveyance path when the switch is located at the first position, and
        disconnects the insertion/discharge port from the first conveyance path and connects the first conveyance path and the second conveyance path when the switch is located at the second position,
    the conveyer conveys a medium from the first conveyance path to the second conveyance path when the switch is located at the second position, and
    a medium discharged through the second conveyance path is placed on the exit tray when the exit tray is located at the fourth position.

2. The image reading apparatus according to claim 1, further comprising a stopper that is separated from the switch when the switch is located at the first position and is in contact with the switch when the switch is located at the second position.

3. The image reading apparatus according to claim 1, further comprising:
    a feed tray that is connected to the first conveyance path;
    a first sensor that detects whether a medium is placed on the feed tray; and
    a controller that controls the actuator so that the switch is located at the second position when the first sensor detects that a medium is placed on the feed tray.

4. The image reading apparatus according to claim 3, further comprising a second sensor that detects whether the switch is located at the first position or the second position, wherein
the controller controls the conveyer so as to convey a medium from the first conveyance path to the second conveyance path after the second sensor detects that the switch is located at the second position.

5. The image reading apparatus according to claim 4, further comprising a third sensor that detects whether a medium is Inserted through the insertion/discharge port, wherein
when the third sensor detects that a medium is inserted through the insertion/discharge port, the controller controls the conveyer so as to convey the medium inserted through the insertion/discharge port from the insertion/discharge port to the first conveyance path.

6. The image reading apparatus according to claim 5, wherein
the third sensor
detects that a medium is not inserted through the insertion/discharge port when light passing through a predetermined area is detected, and
detects that a medium is inserted through the insertion/discharge port when the light is not detected, and
the second sensor
includes a shielding member that does not block the light when the switch is located at the first position and blocks the light when the switch is located at the second position, and
detects that the switch is located at the first position when the third sensor detects the light.

7. The image reading apparatus according to claim 1, wherein the image reader captures an image on an inserted medium that is inserted through the insertion/discharge port when the inserted medium is conveyed toward the insertion/discharge port along the first conveyance path.

8. An image reading apparatus for reading a first medium and a second medium, comprising:
a first conveyance path having a first end and a second end, wherein the first medium is conveyed from the first end to the second end, and the second medium is conveyed from the second end toward the first end, and then conveyed to the second end;
a second conveyance path that conveys the first medium for discharging the first medium;
a port from which the second medium is fed to the second end of the first conveyance path and the second medium is discharged;
an image reader disposed in the first conveyance path to read the first medium and the second medium;
a switch configured to be positioned:
at a first position to connect the port and the second end of the first conveyance path when the second medium is read; and
at a second position to connect the second conveyance path and the second end of the first conveyance path when the first medium is read;
a conveyer that conveys the first medium from the first conveyance path to the second conveyance path, and that conveys the second medium from the port to the first conveyance path and from the first conveyance path to the port;
an actuator that moves the switch to the second position when the first medium is read and moves the switch to the first position when the second medium is read;
a casing of the image reading apparatus;
an exit tray positioned at a stand-by position when the second medium is read and at a standing position when the first medium is read, wherein the exit tray at the stand-by position is retracted into the casing, and the exit tray at the standing position stands from the casing to receive the first medium from the second conveyance path; and
a gear mechanism that associates the switch with the exit tray to
move the exit tray to the standing position from the stand-by position when the switch moves to the second position, and
move the exit tray to the stand-by position from the standing position when the switch moves to the first position.

9. The image reading apparatus according to claim 8, further comprising:
a feed tray that is connected to the first conveyance path;
a first sensor that detects whether the first medium is placed on the feed tray; and
a controller that controls the actuator so that the switch is located at the second position when the first sensor detects that the first medium is placed on the feed tray.

10. The image reading apparatus according to claim 9, further comprising a second sensor that detects whether the switch is located at the first position or the second position, wherein
the controller controls the conveyer so as to convey the second medium from the first conveyance path to the second conveyance path after the second sensor detects that the switch is located at the second position.

11. The image reading apparatus according to claim 10, further comprising a third sensor that detects whether the second medium is inserted through the insertion/discharge port, wherein
when the third sensor detects that the second medium is inserted through the insertion/discharge port, the controller controls the conveyer so as to convey the second medium from the insertion/discharge port to the first conveyance path.

12. The image reading apparatus according to claim 11, wherein
the third sensor
detects that the second medium is not inserted through the insertion/discharge port when light passing through a predetermined area is detected, and
detects that the second medium is inserted through the insertion/discharge port when the light is not detected, and
the second sensor
includes a shielding member that does not block the light when the switch is located at the first position and blocks the light when the switch is located at the second position, and
detects that the switch is located at the first position when the third sensor detects the light.

13. The image reading apparatus according to claim 8, wherein the image reader captures an image on the second medium when the second medium is conveyed from the first end to the second end along the first conveyance path.

14. The image reading apparatus according to claim 8, further comprising a stopper that is separated from the switch when the switch is located at the first position and is in contact with the switch when the switch is located at the second position.

15. An image reading apparatus comprising:
a first conveyance path;

a second conveyance path;
an insertion/discharge port;
an image reader that reads an image on a medium conveyed along the first conveyance path;
a switch that is located at a first position or a second position;
a conveyer that conveys a medium inserted through the insertion/discharge port to the first conveyance path or discharges a medium conveyed along the first conveyance path through the insertion/discharge port when the switch is located at the first position;
an actuator that locates the switch at the first position or the second position;
a feed tray that is connected to the first conveyance path;
a first sensor that detects whether a medium is placed on the feed tray;
a controller that controls the actuator so that the switch is located at the second position when the first sensor detects that a medium is placed on the feed tray;
a second sensor that detects whether the switch is located at the first position or the second position; and
a third sensor that detects whether a medium is inserted through the insertion/discharge port, wherein
the switch
disconnects the first conveyance path from the second conveyance path and connects the insertion/discharge port and the first conveyance path when the switch is located at the first position, and
disconnects the insertion/discharge port from the first conveyance path and connects the first conveyance path and the second conveyance path when the switch is located at the second position,
the conveyer conveys a medium from the first conveyance path to the second conveyance path when the switch is located at the second position, and
a medium discharged through the second conveyance path is placed on the exit tray when the exit tray is located at the first position,
the controller controls the conveyer so as to convey a medium from the first conveyance path to the second conveyance path after the second sensor detects that the switch is located at the second position,
when the third sensor detects that a medium is inserted through the insertion/discharge port, the controller controls the conveyer so as to convey the medium inserted through the insertion/discharge port from the insertion/discharge port to the first conveyance path,
the third sensor
detects that a medium is not inserted through the insertion/discharge port when light passing through a predetermined area is detected, and
detects that a medium is inserted through the insertion/discharge port when the light is not detected, and
the second sensor
includes a shielding member that does not block the light when the switch is located at the first position and blocks the light when the switch is located at the second position, and
detects that the switch is located at the first position when the third sensor detects the light.

16. An image reading apparatus for reading a first medium and a second medium, comprising:
a first conveyance path having a first end and a second end, wherein the first medium is conveyed from the first end to the second end, and the second medium is conveyed from the second end toward the first end, and then conveyed to the second end;
a second conveyance path that conveys the first medium for discharging the first medium;
a port from which the second medium is fed to the second end of the first conveyance path and the second medium is discharged;
an image reader disposed in the first conveyance path to read the first medium and the second medium;
a switch configured to be positioned:
at a first position to connect the port and the second end of the first conveyance path when the second medium is read; and
at a second position to connect the second conveyance path and the second end of the first conveyance path when the first medium is read;
a conveyer that conveys the first medium from the first conveyance path to the second conveyance path, and that conveys the second medium from the port to the first conveyance path and from the first conveyance path to the port;
an actuator that moves the switch to the second position when the first medium is read and moves the switch to the first position when the second medium is read;
a feed tray that is connected to the first conveyance path;
a first sensor that detects whether the first medium is placed on the feed tray;
a second sensor that detects whether the switch is located at the first position or the second position;
a third sensor that detects whether the second medium is inserted through the insertion/discharge port; and
a controller that controls the actuator so that the switch is located at the second position when the first sensor detects that the first medium is placed on the feed tray, controls the conveyer so as to convey the second medium from the first conveyance path to the second conveyance path after the second sensor detects that the switch is located at the second position, and controls the conveyer so as to convey the second medium from the insertion/discharge port to the first conveyance path when the third sensor detects that the second medium is inserted through the insertion/discharge port, wherein
the third sensor
detects that the second medium is not inserted through the insertion/discharge port when light passing through a predetermined area is detected, and
detects that the second medium is inserted through the insertion/discharge port when the light is not detected, and
the second sensor
includes a shielding member that does not block the light when the switch is located at the first position and blocks the light when the switch is located at the second position, and
detects that the switch is located at the first position when the third sensor detects the light.

* * * * *